United States Patent
Sakamoto et al.

(10) Patent No.: US 12,246,643 B2
(45) Date of Patent: Mar. 11, 2025

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Takumi Sakamoto, Toyota (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/631,110

(22) Filed: Apr. 10, 2024

(65) Prior Publication Data

US 2024/0351513 A1    Oct. 24, 2024

(30) Foreign Application Priority Data

Apr. 19, 2023    (JP) .................. 2023-068265

(51) Int. Cl.
*B60Q 1/50* (2006.01)
*G05D 1/617* (2024.01)

(52) U.S. Cl.
CPC ............. *B60Q 1/507* (2022.05); *B60Q 1/543* (2022.05); *G05D 1/617* (2024.01)

(58) Field of Classification Search
CPC ...... G01B 11/254; B60Q 1/507; B60Q 1/543; G05D 1/617
See application file for complete search history.

(56) References Cited

U.S. PATENT DOCUMENTS

2017/0173796 A1* 6/2017 Kim ..................... B25J 9/1612
2021/0339393 A1* 11/2021 Dan ....................... B25J 5/007
2022/0134942 A1* 5/2022 Suzuki ................ B60Q 1/1423
                                                              180/204

FOREIGN PATENT DOCUMENTS

JP    2019-526857 A    9/2019
JP    7103689 B2       7/2022
WO    2018/034686 A1   2/2018

* cited by examiner

*Primary Examiner* — William J Carter
(74) *Attorney, Agent, or Firm* — Oliff PLC

(57) ABSTRACT

A control system controls a system including an autonomously movable mobile robot configured to transport a transport object. The mobile robot includes at least one light-emitting unit. The control system is configured to change a light emission pattern of the light-emitting unit according to transport object information indicating whether the mobile robot is transporting the transport object.

19 Claims, 12 Drawing Sheets

FIG. 2
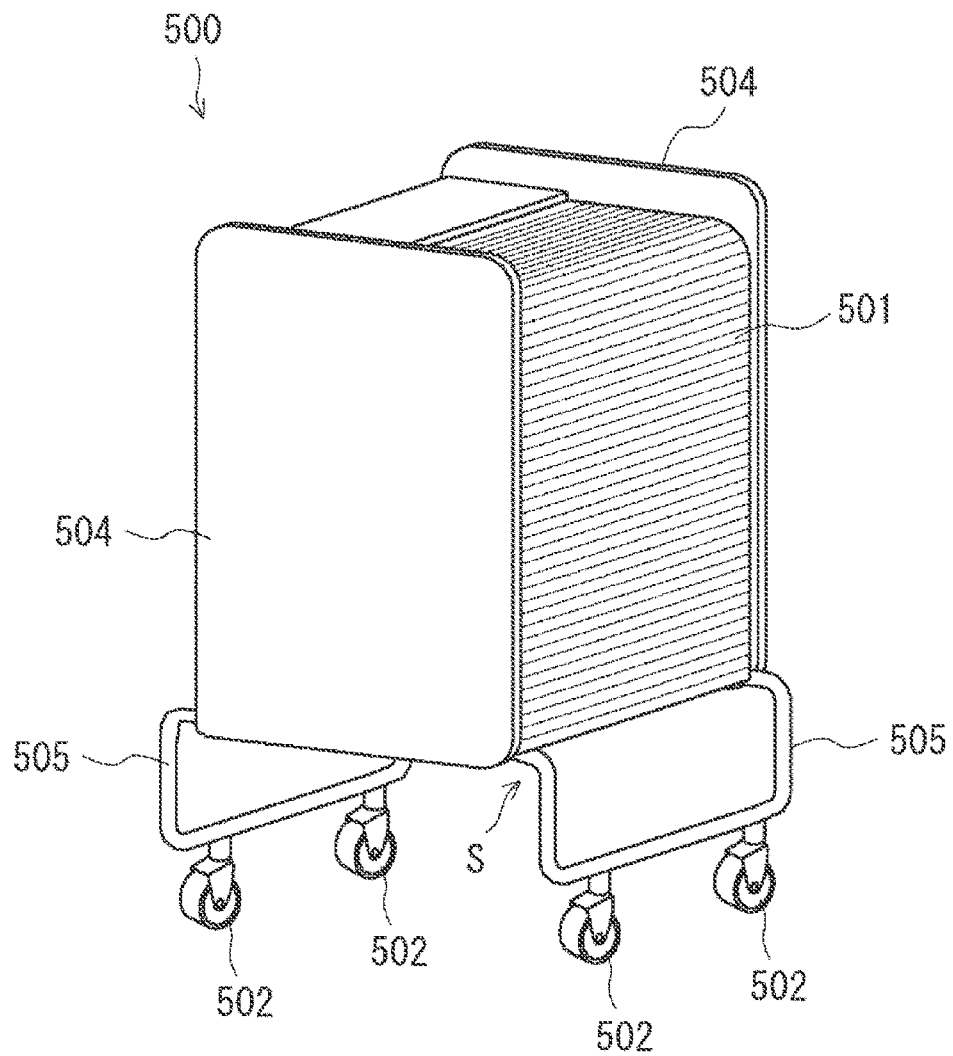
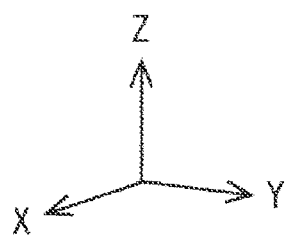

FIG. 5
| TRANSPORT OBJECT | FIRST LIGHT-EMITTING UNIT | SECOND LIGHT-EMITTING UNIT |
|---|---|---|
| NO TRANSPORT OBJECT | 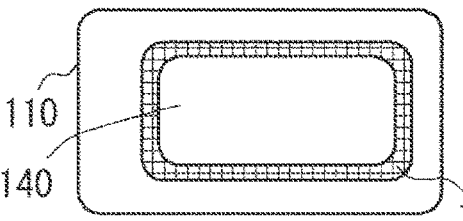 | 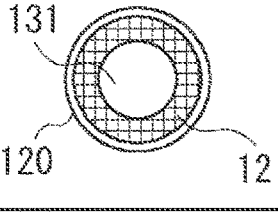 |
| TRANSPORT OBJECT | 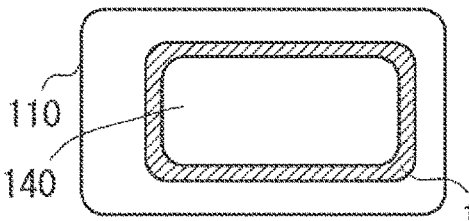 | 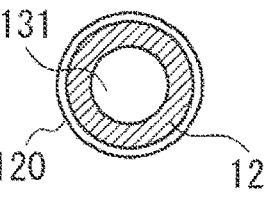 |
| PRIORITY TRANSPORT OBJECT | 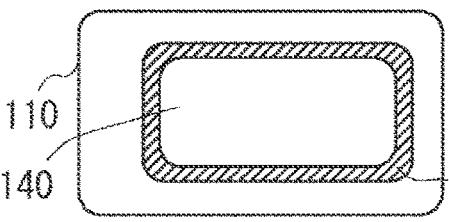 | 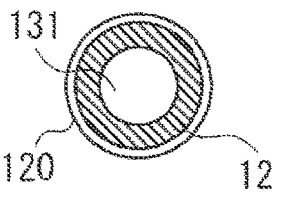 |
| TRANSPORT OBJECT REQUIRING ATTENTION | 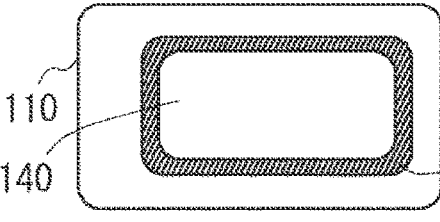 | 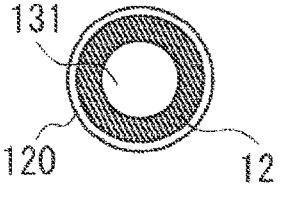 |

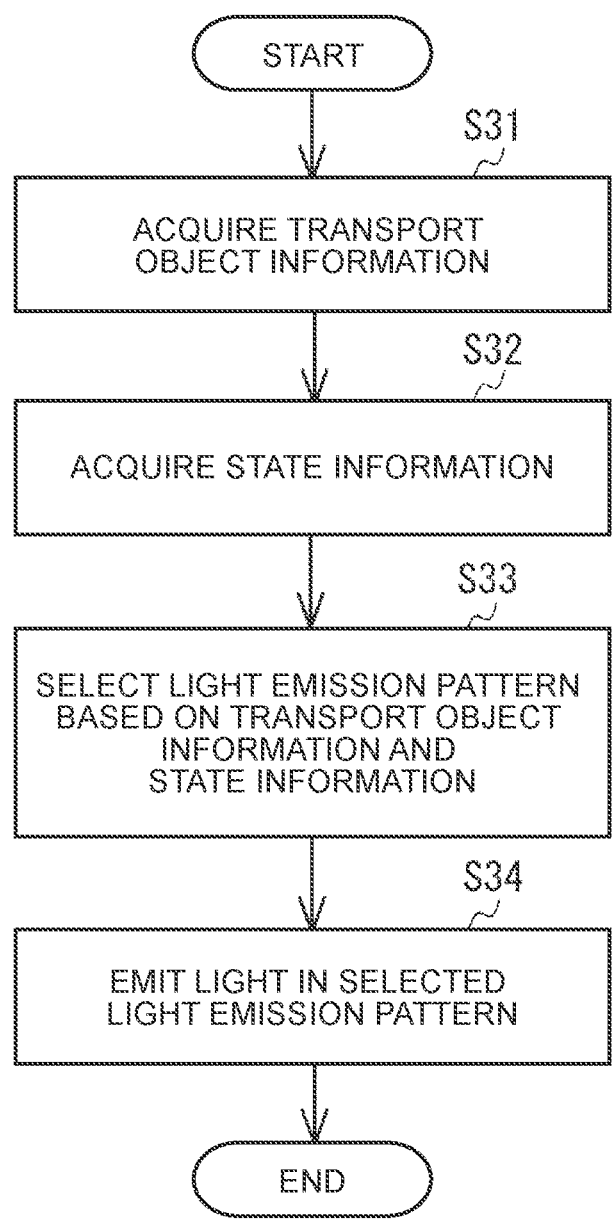

FIG. 8

| TRANSPORT OBJECT | FIRST LIGHT-EMITTING UNIT | | SECOND LIGHT-EMITTING UNIT | |
|---|---|---|---|---|
| | COLOR | TURN-ON PATTERN | COLOR | TURN-ON PATTERN |
| NO TRANSPORT OBJECT | GREEN | ALWAYS ON | GREEN | ALWAYS ON |
| TRANSPORT OBJECT | BLUE | ALWAYS ON | BLUE | ALWAYS ON |
| PRIORITY TRANSPORT OBJECT | ORANGE | FLASHING (NORMAL INTERVALS) | ORANGE | FLASHING (NORMAL INTERVALS) |
| TRANSPORT OBJECT REQUIRING ATTENTION | RED | FLASHING (SHORT INTERVALS) | GREEN | FLASHING (LONG INTERVALS) |

FIG. 9

| STATE OF MOBILE ROBOT | | FIRST LIGHT-EMITTING UNIT | | SECOND LIGHT-EMITTING UNIT | |
|---|---|---|---|---|---|
| | | COLOR | TURN-ON PATTERN | COLOR | TURN-ON PATTERN |
| AUTONOMOUS MOVEMENT MODE (NORMAL) | TRAVELING AUTONOMOUSLY | GREEN | ALWAYS ON | GREEN | ALWAYS ON |
| | ON STANDBY | GREEN | BREATHING RHYTHM | GREEN | ALWAYS ON |
| | PROMPT AN OPERATION | BLUE | SEQUENTIAL LIGHTING | GREEN | ALWAYS ON |
| | ALERT | ORANGE | FLASHING (LONG INTERVALS) | GREEN | ALWAYS ON |
| USER OPERATION MODE (NORMAL) | | BLUE | SEQUENTIAL LIGHTING | ORANGE | ALWAYS ON |
| ABNORMAL | | RED | FLASHING (SHORT INTERVALS) | RED | ALWAYS ON |

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068265 filed on Apr. 19, 2023, incorporated herein by reference in its entirety.

BACKGROUND

1. Technical Field

The present disclosure relates to control systems, control methods, and non-transitory storage mediums.

2. Description of Related Art

Japanese Patent No. 7103689 (JP 7103689 B) discloses an autonomously movable mobile robot configured to transport an object to be transported (hereinafter also referred to as "transport object").

SUMMARY

However, the mobile robot described in JP 7103689 B cannot clearly notify the surroundings of the mobile robot of whether the mobile robot is transporting a transport object.

The present disclosure provides a control system, control method, and non-transitory storage medium that allow an autonomously movable mobile robot configured to transport a transport object to clearly notify the surroundings of the mobile robot whether the mobile robot is transporting a transport object.

One aspect of the present disclosure provides a control system. This control system is a control system that controls a system including an autonomously movable mobile robot configured to transport a transport object. The mobile robot includes at least one light-emitting unit, and the control system is configured to change a light emission pattern of the light-emitting unit according to transport object information indicating whether the mobile robot is transporting the transport object. With such a configuration, the control system allows the autonomously movable mobile robot configured to transport a transport object to clearly notify the surroundings of the mobile robot of whether the mobile robot is transporting a transport object. In autonomous movement control, the mobile robot can be controlled to move autonomously using a learning model obtained through machine learning.

When the mobile robot is transporting the transport object, the transport object information may include information indicating the transport object being transported by the mobile robot. With such a configuration, the control system allows the mobile robot to clearly notify the surroundings of the mobile robot of the transport object being transported by the mobile robot.

The mobile robot may be configured to transport the transport object by using a transport box configured to house the transport object. When the mobile robot is transporting the transport object, the transport object information may include information indicating a type of the transport box being transported by the mobile robot. With such a configuration, the control system allows the mobile robot to clearly notify the surroundings of the mobile robot of the type of the transport box being transported by the mobile robot.

The at least one light-emitting unit may include a plurality of light-emitting units mounted at a plurality of positions away from each other. The control system may be configured to change the light emission pattern by changing a position where light is emitted. With such a configuration, the control system allows the mobile robot to more clearly notify the surroundings of the mobile robot of whether the mobile robot is transporting a transport object.

The at least one light-emitting unit may include a plurality of light-emitting units mounted at a plurality of positions away from each other. The control system may be configured to change the light emission pattern by changing positions where light is synchronously emitted. With such a configuration, the control system allows the mobile robot to more clearly notify the surroundings of the mobile robot of whether the mobile robot is transporting a transport object.

The control system may be configured to cause light to be emitted in a light emission pattern having a mutually complementary relationship at the positions where light is synchronously emitted. With such a configuration, the control system allows the mobile robot to even more clearly notify the surroundings of the mobile robot of whether the mobile robot is transporting a transport object.

The mobile robot may include a contact portion configured to contact the transport object when the transport object is loaded and transported, and the at least one light-emitting unit may include a first light-emitting unit mounted around the contact portion. With such a configuration, the control system allows the mobile robot to clearly notify the surroundings of the mobile robot of whether the mobile robot is transporting a transport object, even when the transport object is loaded on the contact portion.

The mobile robot may include an operation interface configured to operate the mobile robot, and the at least one light-emitting unit may include a second light-emitting unit mounted on or around the operation interface. With such a configuration, the control system allows the mobile robot to indicate at a position easily visible from an operator or the surroundings, namely at an operation position, whether the mobile robot is transporting a transport object.

The control system may be configured to change the light emission pattern by changing at least one of brightness, hue, saturation, and lightness of light that is emitted from the light-emitting unit. With such a configuration, the control system allows the mobile robot to even more clearly notify the surroundings of the mobile robot of whether the mobile robot is transporting a transport object.

The system may include a server that is connectable to the mobile robot via wireless communication, and the control system may be configured to determine, based on an image of the mobile robot captured by a camera, the transport object information from the light emission pattern shown by the image, at least when the server is unable to communicate with the mobile robot. With such a configuration, the server of the control system can determine whether the mobile robot is transporting a transport object, even when the mobile robot and the server are unable to communicate with each other.

A control method according to the present disclosure is a control method for controlling a system including an autonomously movable mobile robot configured to transport a transport object. The mobile robot includes at least one light-emitting unit, and the control method includes a step of changing a light emission pattern of the light-emitting unit according to transport object information indicating whether the mobile robot is transporting the transport object. With such a configuration, the control method allows the autonomously movable mobile robot configured to transport a transport object to clearly notify the surroundings of the mobile robot of whether the mobile robot is transporting a transport object.

When the mobile robot is transporting the transport object, the transport object information may include information indicating the transport object being transported by the mobile robot. With such a configuration, the control method allows the mobile robot to clearly notify the surroundings of the mobile robot of the transport object being transported by the mobile robot.

The mobile robot may be configured to transport the transport object by using a transport box configured to house the transport object. When the mobile robot is transporting the transport object, the transport object information may include information indicating a type of the transport box being transported by the mobile robot. With such a configuration, the control method allows the mobile robot to clearly notify the surroundings of the mobile robot of the type of the transport box being transported by the mobile robot.

The at least one light-emitting unit include a plurality of light-emitting units mounted at a plurality of positions away from each other, and the step of changing the light emission pattern may include changing a position where light is emitted. With such a configuration, the control method allows the mobile robot to more clearly notify the surroundings of the mobile robot of whether the mobile robot is transporting a transport object.

The at least one light-emitting unit may include a plurality of light-emitting units mounted at a plurality of positions away from each other, and the step of changing the light emission pattern may include changing a plurality of positions where light is synchronously emitted. With such a configuration, the control method allows the mobile robot to more clearly notify the surroundings of the mobile robot of whether the mobile robot is transporting a transport object.

The control method may further include causing light to be emitted in a light emission pattern having a mutually complementary relationship at the positions where light is synchronously emitted. With such a configuration, the control method allows the mobile robot to even more clearly notify the surroundings of the mobile robot of whether the mobile robot is transporting a transport object.

The mobile robot may include a contact portion configured to contact the transport object when the transport object is loaded and transported, and the at least one light-emitting unit may include a first light-emitting unit mounted around the contact portion. With such a configuration, the control method allows the mobile robot to clearly notify the surroundings of the mobile robot of whether the mobile robot is transporting a transport object, even when the transport object is loaded on the contact portion.

The mobile robot may include an operation interface configured to operate the mobile robot, and the at least one light-emitting unit may include a second light-emitting unit mounted on or around the operation interface. With such a configuration, the control method allows the mobile robot to indicate at a position easily visible from an operator or the surroundings, namely at an operation position, whether the mobile robot is transporting a transport object.

The step of changing the light emission pattern may include changing at least one of brightness, hue, saturation, and lightness of light that is emitted from the light-emitting unit. With such a configuration, the control method allows the mobile robot to even more clearly notify the surroundings of the mobile robot of whether the mobile robot is transporting a transport object.

The system may include a server that is connectable to the mobile robot via wireless communication, and the control method may further include determining, based on an image of the mobile robot captured by a camera, the transport object information from the light emission pattern shown by the image, at least when the server is unable to communicate with the mobile robot. With such a configuration, the control method can determine whether the mobile robot is transporting a transport object, even when the mobile robot and the server are unable to communicate with each other.

A non-transitory storage medium according to the present disclosure is a non-transitory storage medium storing instructions that are executable by one or more processors and that cause the one or more processors to perform a process for controlling a system including an autonomously movable mobile robot configured to transport a transport object. The mobile robot includes at least one light-emitting unit, and the process includes changing a light emission pattern of the light-emitting unit according to transport object information indicating whether the mobile robot is transporting the transport object. With such a configuration, the non-transitory storage medium allows the autonomously movable mobile robot configured to transport a transport object to clearly notify the surroundings of the mobile robot of whether the mobile robot is transporting a transport object.

When the mobile robot is transporting the transport object, the transport object information may include information indicating the transport object being transported by the mobile robot. With such a configuration, the non-transitory storage medium allows the mobile robot to clearly notify the surroundings of the mobile robot of the transport object being transported by the mobile robot.

The mobile robot may be configured to transport the transport object by using a transport box configured to house the transport object. When the mobile robot is transporting the transport object, the transport object information may include information indicating a type of the transport box being transported by the mobile robot. With such a configuration, the non-transitory storage medium allows the mobile robot to clearly notify the surroundings of the mobile robot of the type of the transport box being transported by the mobile robot.

The at least one light-emitting unit may include a plurality of light-emitting units mounted at a plurality of positions away from each other, and the process of changing the light emission pattern may include changing a position where light is emitted. With such a configuration, the non-transitory storage medium allows the mobile robot to more clearly notify the surroundings of the mobile robot of whether the mobile robot is transporting a transport object.

The at least one light-emitting unit may include a plurality of light-emitting units mounted at a plurality of positions away from each other, and the process of changing the light emission pattern may include changing a plurality of positions where light is synchronously emitted. With such a configuration, the non-transitory storage medium allows the mobile robot to more clearly notify the surroundings of the mobile robot of whether the mobile robot is transporting a transport object.

The process may further include causing light to be emitted in the light emission pattern having a mutually complementary relationship at the positions where light is synchronously emitted. With such a configuration, the non-transitory storage medium allows the mobile robot to even more clearly notify the surroundings of the mobile robot of whether the mobile robot is transporting a transport object.

The mobile robot may include a contact portion configured to contact the transport object when the transport object is loaded and transported, and the at least one light-emitting unit may include a first light-emitting unit mounted around the contact portion. With such a configuration, the non-transitory storage medium allows the mobile robot to clearly notify the surroundings of the mobile robot of whether the mobile robot is transporting a transport object, even when the transport object is loaded on the contact portion.

The mobile robot may include an operation interface configured to operate the mobile robot, and the at least one light-emitting unit may include a second light-emitting unit mounted on or around the operation interface. With such a configuration, the non-transitory storage medium allows the mobile robot to indicate at a position easily visible from an operator or the surroundings, namely at an operation position, whether the mobile robot is transporting a transport object.

The process of changing the light emission pattern may include changing at least one of brightness, hue, saturation, and lightness of light that is emitted from the light-emitting unit. With such a configuration, the non-transitory storage medium allows the mobile robot to even more clearly notify the surroundings of the mobile robot of whether the mobile robot is transporting a transport object.

Another non-transitory storage medium according to the present disclosure is a non-transitory storage medium storing instructions that are executable by one or more processors and that cause the one or more processors to perform a determination process, the one or more processors being included in a server that is connectable via wireless communication to an autonomously movable mobile robot configured to transport a transport object. The mobile robot includes at least one light-emitting unit configured to emit light in such a manner that a light emission pattern is changed according to transport object information indicating whether the mobile robot is transporting the transport object. The determination process includes a process of determining, based on an image of the mobile robot captured by a camera, the transport object information from the light emission pattern shown by the image, at least when the server is unable to communicate with the mobile robot. With such a configuration, the non-transitory storage medium can determine whether the mobile robot is transporting a transport object, even when the mobile robot and the server are unable to communicate with each other.

According to the present disclosure, it is possible to provide a control system, control method, and non-transitory storage medium that allow an autonomously movable mobile robot configured to transport a transport object to clearly notify the surroundings of the mobile robot whether the mobile robot is transporting an object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a perspective view showing an example of the overall configuration of a wagon that is transported by the mobile robot in FIG. 1;

FIG. 5 shows an example of light emission patterns that can be implemented by the mobile robot in FIG. 1;

FIG. 7 is a flowchart illustrating still another example of the light emission process that is performed by the mobile robot in FIG. 1;

FIG. 8 shows another example of the light emission patterns that can be implemented by the mobile robot in FIG. 1;

FIG. 9 shows still another example of the light emission patterns that can be implemented by the mobile robot in FIG. 1;

DETAILED DESCRIPTION OF EMBODIMENTS

Hereinafter, the present disclosure will be described based on an embodiment of the disclosure. However, the disclosure according to the claims is not limited to the following embodiment. Not all of the configurations described in the embodiment are essential as means for solving the problem.

Embodiment

Figure 1:
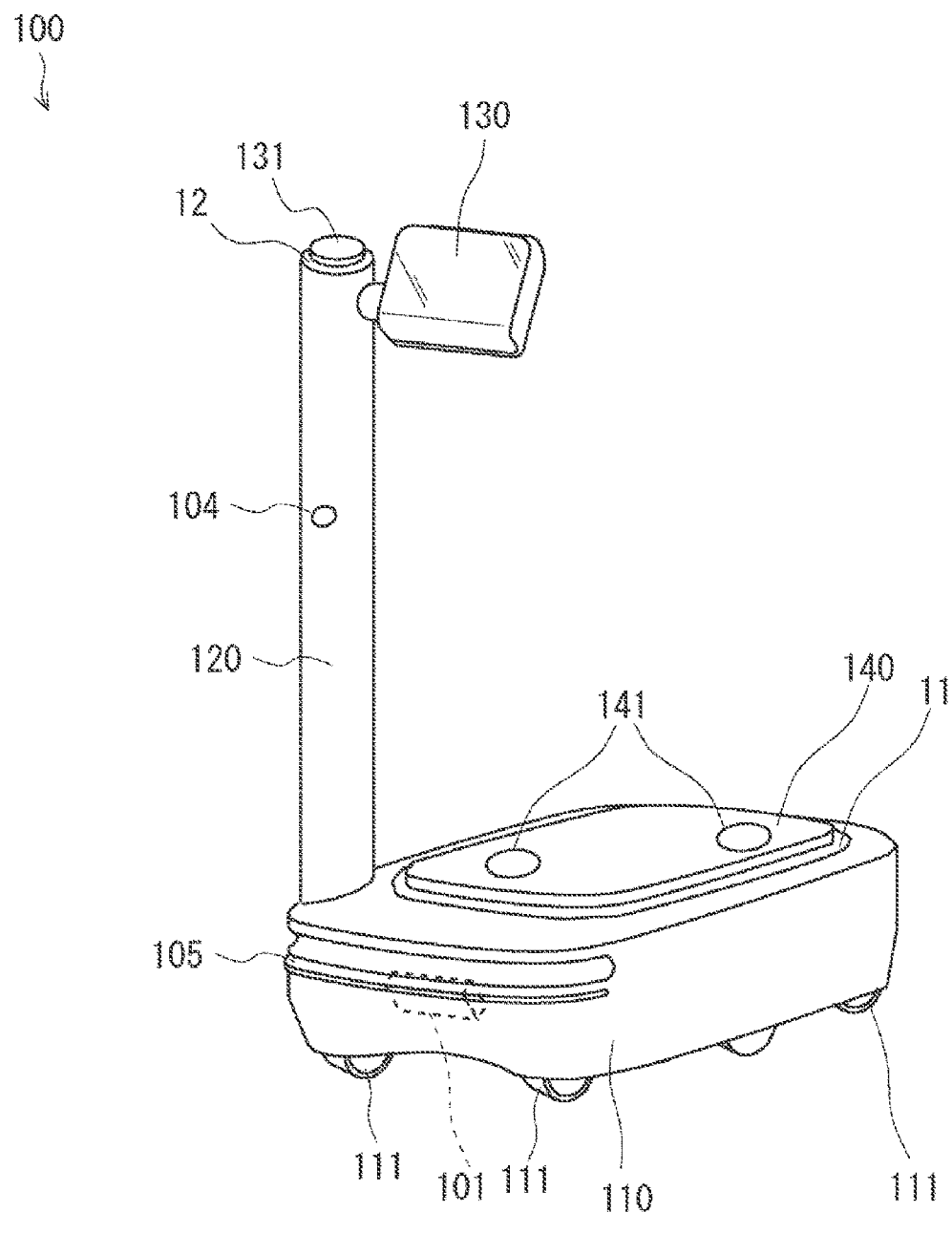
FIG. 1 is a perspective view showing an example of the overall configuration of a mobile robot according to an embodiment.

A control system according to the embodiment performs system control for controlling a system including an autonomously movable mobile robot configured to transport an object (hereinafter this system will be referred to as "transport system"). This mobile robot can also be referred to as "transport robot" because it can transport an object. An example of the configuration of the mobile robot according to the present embodiment will be described below with reference to FIGS. 1 and 2. FIG. 1 is a perspective view showing an example of the overall configuration of the mobile robot according to the present embodiment, and FIG. 2 is a perspective view showing an example of the overall configuration of a wagon that is transported by the mobile robot in FIG. 1.

The transport system need only include a mobile robot such as a mobile robot 100 shown in FIG. 1. The transport system may further include other devices such as a host management device. For simplicity of description, an example will first be given in which the transport system is composed of the mobile robot 100 alone. Main features of the transport system will be described. In this example, the term "control system" can refer to either the mobile robot 100 itself or components of a control system included in the mobile robot 100.

The following description will be given using an XYZ orthogonal coordinate system as appropriate. An X direction is a front-rear direction of the mobile robot 100 in FIG. 1, a Y direction is a right-left direction of the mobile robot 100 in FIG. 1, and a Z direction is a vertical up-down direction. More specifically, a +X direction is defined as a forward direction of the mobile robot 100, and a −X direction is defined as a rearward direction of the mobile robot 100. A +Y direction is a leftward direction of the mobile robot 100, and a −Y direction is a rightward direction of the mobile robot 100. A +Z direction is a vertically upward direction, and a −Z direction is a vertically downward direction.

The mobile robot 100 is movable in both the forward and rearward directions. That is, the mobile robot 100 moves in the forward direction when its wheels are rotated forward, and moves in the rearward direction when the wheels are rotated in reverse. Changing the rotational speed between the right and left wheels allows the mobile robot 100 to turn right or left.

As shown in FIG. 1, the mobile robot 100 can include a platform 110 on which a transport object is to be loaded, a stand 120, and an operation unit 130. The platform 110 is equipped with wheels 111, axles, a battery, a control computer 101, a drive motor, etc. It is herein assumed that the control computer 101 is mounted at the illustrated position in the platform 110. However, the control computer 101 need not necessarily be mounted at this position. The control computer 101 may be mounted at any other position in the platform 110, or part of the control computer 101 or the entire control computer 101 may be mounted in either or both of the stand 120 and the operation unit 130.

The platform 110 rotatably holds the wheels 111. In the example in FIG. 1, the platform 110 is provided with four wheels 111. The four wheels 111 are right and left front wheels and right and left rear wheels. The mobile robot 100 moves along a desired route by independently controlling the rotational directions and rotational speeds of the wheels 111. Part of the four wheels 111 may be drive wheels, and the rest of the wheels 111 may be driven wheels. As shown in FIG. 1, an additional driven wheel(s) may be provided between the front and rear wheels 111.

In order to prevent contact with an obstacle, check the route, etc., various sensors such as a camera and a distance sensor may be provided in at least one of the following components: the platform 110, the operation unit 130, and the stand 120.

FIG. 1 shows an example in which a camera 104 and a sensor 105 are provided as such sensors. The camera 104 is mounted facing the +X side on the stand 120, and the sensor 105 is mounted on the front side of the platform 110. A bumper can be installed on the front side of the platform 110, and the sensor 105 can be mounted on the bumper. The sensor 105 detects when an object comes into contact with the bumper. The mobile robot 100 can be controlled to stop when the sensor 105 detects contact of an object, that is, contact of an obstacle. Therefore, the sensor 105 can be referred to as "stop sensor." The sensor 105 need not necessarily be mounted on the front side. The sensor 105 may be a sensor that detects contact of an object with a bumper installed on part or all of the outer periphery of the mobile robot 100.

The mobile robot 100 is an autonomous mobile robot. However, the mobile robot 100 may have a function to move according to user's operations. That is, the mobile robot 100 may be a mobile robot configured to switch between an autonomous movement mode and a user operation mode. By the autonomous movement control, the mobile robot 100 can be controlled to move autonomously based on a route determined according to a set transport destination or a set route. In the autonomous movement control, the mobile robot 100 can also be controlled to move autonomously by determining a route, performing contact avoidance, etc. using a learning model obtained through machine learning.

The user operation mode in which the mobile robot 100 moves based on user operations may be any mode as long as the degree of involvement of the user operations is relatively high compared to the autonomous movement mode in which the mobile robot 100 moves autonomously. In other words, the user operation mode need not be limited to a mode in which the user controls all movements of the mobile robot with no autonomous control by the mobile robot. Similarly, the autonomous movement mode need not be limited to a mode in which the mobile robot performs fully autonomous control and does not accept any user operations. For example, the user operation mode and the autonomous movement mode may include the following first to third examples.

In the first example, the autonomous movement mode is a mode in which the mobile robot travels autonomously and determines when to stop and when to start traveling and the user does not perform any operations, and the user operation mode is a mode in which the mobile robot travels autonomously and the user operates to stop the mobile robot and to control the mobile robot to start traveling. In the second example, the autonomous movement mode is a mode in which the mobile robot travels autonomously and the user operates to stop the mobile robot and to control the mobile robot to start traveling, and the user operation mode is a mode in which the mobile robot does not travel autonomously and the user not only operates to stop the mobile robot and to control the mobile robot to start traveling but also operates to control the mobile robot to travel. In the third example, the autonomous movement mode is a mode in which the mobile robot travels autonomously and determines when to stop and when to start traveling and the user does not perform any operations, and the user operation mode is a mode in which the mobile robot travels autonomously for speed adjustment, contact avoidance, etc. and the user operates to change the direction of travel and the route etc.

The user may be a worker etc. at a facility where the mobile robot 100 is utilized, and may be a hospital worker when the facility is a hospital.

The control computer 101 can be implemented by, for example, integrated circuitry, and can be implemented by, for example, a processor such as a micro processor unit (MPU) or a central processing unit (CPU), a working memory, and a nonvolatile storage device. Control programs to be executed by the processor are stored in the storage device, and the processor can perform the function to control the mobile robot 100 by loading the programs into the working memory and executing them. The control computer 101 can be referred to as "control unit."

The control computer 101 controls the mobile robot 100 to move autonomously toward a preset transport destination or along a preset transport route, based on prestored map data and information acquired by the various sensors exemplified by the camera 104. This autonomous movement control can include control for loading a wagon 500 shown in FIG. 2 and control for unloading the wagon 500. The wagon 500 will be described later. It can be said that the control computer 101 can include a movement control unit that performs such autonomous movement control.

In order to load and unload a transport object such as the wagon 500, the platform 110 can include a lifting mechanism 140 for loading and unloading a transport object. Part of the lifting mechanism 140 can be housed inside the platform 110. The lifting mechanism 140 can be installed with its loading surface, namely its surface on which a transport object is to be loaded, being exposed on the upper side surface of the platform 110. The lifting mechanism 140 is a lifting stage configured to be raised and lowered, and can be raised and lowered as controlled by the control computer 101. The platform 110 is provided with a motor and a guide mechanism for the raising and lowering of the lifting mechanism 140. An upper surface of the lifting mechanism 140 serves as the loading surface on which the wagon 500 as a transport object is to be loaded. The wagon 500 is not limited to the configuration shown in FIG. 2, and may be any predetermined wagon of a size, shape, and weight that are loadable and transportable on the lifting mechanism 140. The lifting mechanism 140 includes a lift mechanism for lifting the wagon 500. Space above the lifting mechanism 140 serves as a loading space for loading a transport object. As far as the user loads the wagon 500, the platform 110 may not include the lifting mechanism 140.

The platform 110 can include a first light-emitting unit 11 at a position around the lifting mechanism 140. The first light-emitting unit 11 may have any configuration as long as it can emit light. The first light-emitting unit 11 can be composed of, for example, one or more light-emitting diodes (LEDs) or organic electroluminescence, and its light emission can be controlled by the control computer 101. The position, shape, and size of the first light-emitting unit 11 are not limited to those illustrated in the drawings. The mobile robot 100 can include the first light-emitting unit 11 even when the mobile robot 100 does not include the lifting mechanism 140.

The stand 120 is attached to the platform 110. The stand 120 is a rod-shaped member extending upward from the platform 110. In this example, the stand 120 is in a cylindrical shape that is long in the Z direction. However, the stand 120 may be in any shape, and the mobile robot 100 may not include the stand 120. The longitudinal direction of the stand 120 is parallel to the Z direction. The stand 120 is installed outside the lifting mechanism 140. That is, the stand 120 is installed so as not to interfere with the rising and lowering movements of the lifting mechanism 140. The stand 120 is installed on one end side of the platform 110 in the Y direction (right-left direction). The stand 120 is attached near the right front corner of the platform 110. The stand 120 is installed at the end of the platform 110 that is located on the +X side and −Y side on an XY plane.

The stand 120 may be provided with, for example, a stick unit 131 of a joystick device or an emergency stop button for stopping the mobile robot 100 in case of emergency, on its upper surface portion. The joystick device is a device that is operated to move the mobile robot 100 in a direction intended by the user when in the user operation mode. The joystick device can receive a directional operation when the stick unit 131 is tilted in a direction in which the user wants the mobile robot 100 to move. The joystick device can also be controlled to perform a select operation by depressing the stick unit 131. The stick unit 131 may be configured to serve as an emergency stop button when it is depressed for a predetermined period. In the case where the stick unit 131 is configured to also receive a select operation, this predetermined period need only be set to a different value from a period for the select operation.

The stand 120 can include a second light-emitting unit 12 at a position around the stick unit 131. The second light-emitting unit 12 may have any configuration as long as it can emit light. For example, the second light-emitting unit 12 may be composed of, for example, one or more LEDs or organic electroluminescence, and its light emission can be controlled by the control computer 101. The position, shape, and size of the second light-emitting unit 12 are not limited to those illustrated in the drawings. The mobile robot 100 can include the second light-emitting unit 12 even when the mobile robot 100 does not include the stand 120 or even when the mobile robot 100 includes the stand 120 but does not include the stick unit 131.

The stand 120 supports the operation unit 130. The operation unit 130 is attached near the upper end of the stand 120. The operation unit 130 can thus be installed at a height that is easy for the user to operate. That is, the stand 120 extends to a height that is easy for the standing user to operate the operation unit 130, and the stick unit 131 is also installed at a height that is easy for the user to operate. The operation unit 130 extends to the +Y side from the stand 120. From the standpoint of ease of operation, the operation unit 130 can be mounted in the middle in the right-left direction of the platform 110.

The operation unit 130 can include a touch panel monitor etc. that receives user operations. The operation unit 130 may include a microphone etc. for audio input. The monitor of the operation unit 130 faces the opposite side from the platform 110. That is, a display surface (operation surface) of the operation unit 130 is a surface on the +X side of the operation unit 130. The operation unit 130 may be detachable from the stand 120. That is, a holder that holds the touch panel may be attached to the stand 120. The user can enter a transport destination of a transport object, transport information about the transport object, etc. by operating the operation unit 130. The operation unit 130 can display, to the user, information such as details of an object being transported or an object to be transported and a destination of the object. The mobile robot 100 may not include the operation unit 130.

As illustrated in the drawings, the operation unit 130 and the stick unit 131 can be mounted at at least about the same height so that they can be operated intuitively. This allows the user to operate the operation unit 130 and the stick unit 131 in an intuitive flow even when an operation to depress the stick unit 131 is assigned to an operation to select an operation displayed on the operation unit 130.

An integrated circuit (IC) card reader for the user to get authenticated using an IC card etc. may be installed on the stand 120 at about the same height position as the operation unit 130 or inside the operation unit 130. Although the mobile robot 100 need not necessarily have a user authentication function, the mobile robot 100 with the user authentication function can block mischievous operations by a third party etc. The user authentication function is not limited to the type using an IC card, and may be of the type using user information and password that are entered via the operation unit 130. However, the user authentication function of the type using various short-range wireless communication technologies that allow contactless authentication can save the user a hassle and can prevent infection.

The user can place a transport object in the wagon 500 loaded on the mobile robot 100 and request the mobile robot 100 to transport the object. The wagon 500 itself can also be referred to as "transport object." Therefore, for convenience, a transport object that is placed in the wagon 500 will be hereinafter referred to as "article" in order to distinguish between them. The mobile robot 100 transports the wagon 500 by autonomously moving to a set destination. That is, the mobile robot 100 performs the task of transporting the wagon 500. In the following description, a location where the wagon 500 is loaded will be referred to as "transport origin" or "loading location," and a location to which the wagon 500 is delivered will be referred to as "transport destination" or "destination."

For example, it is assumed that the mobile robot 100 moves around a general hospital with a plurality of clinical departments. The mobile robot 100 transports an article such as supplies, consumables, and medical equipment between the clinical departments. For example, the mobile robot 100 delivers an article from a nurses' station of one clinical department to a nurses' station of another clinical department. Alternatively, the mobile robot 100 delivers an article from a storage for supplies and medical equipment to a nurses' station of a clinical department. The mobile robot 100 also delivers medicine dispensed in a dispensing department to a clinical department or patient expected to use the medicine.

Examples of the article include medicines, consumables such as bandages, specimens, test equipment, medical equipment, hospital foods, and supplies such as stationery. Examples of the medical equipment include sphygmomanometers, blood transfusion pumps, syringe pumps, foot pumps, nurse call buttons, bed leaving sensors, low-pressure continuous suction devices, electrocardiogram monitors, infusion controllers, enteral feeding pumps, ventilators, cuff pressure gauges, touch sensors, inhalers, nebulizers, pulse oximeters, artificial resuscitators, aseptic isolators, and ultrasound diagnostic equipment. The mobile robot 100 may transport meals such as hospital foods and foods for a special diet a patient follows to prepare for a test may be transported. The mobile robot 100 may transport used equipment, used tableware, etc. When the transport destination is on a different floor, the mobile robot 100 may move using an elevator etc.

Figure 3:
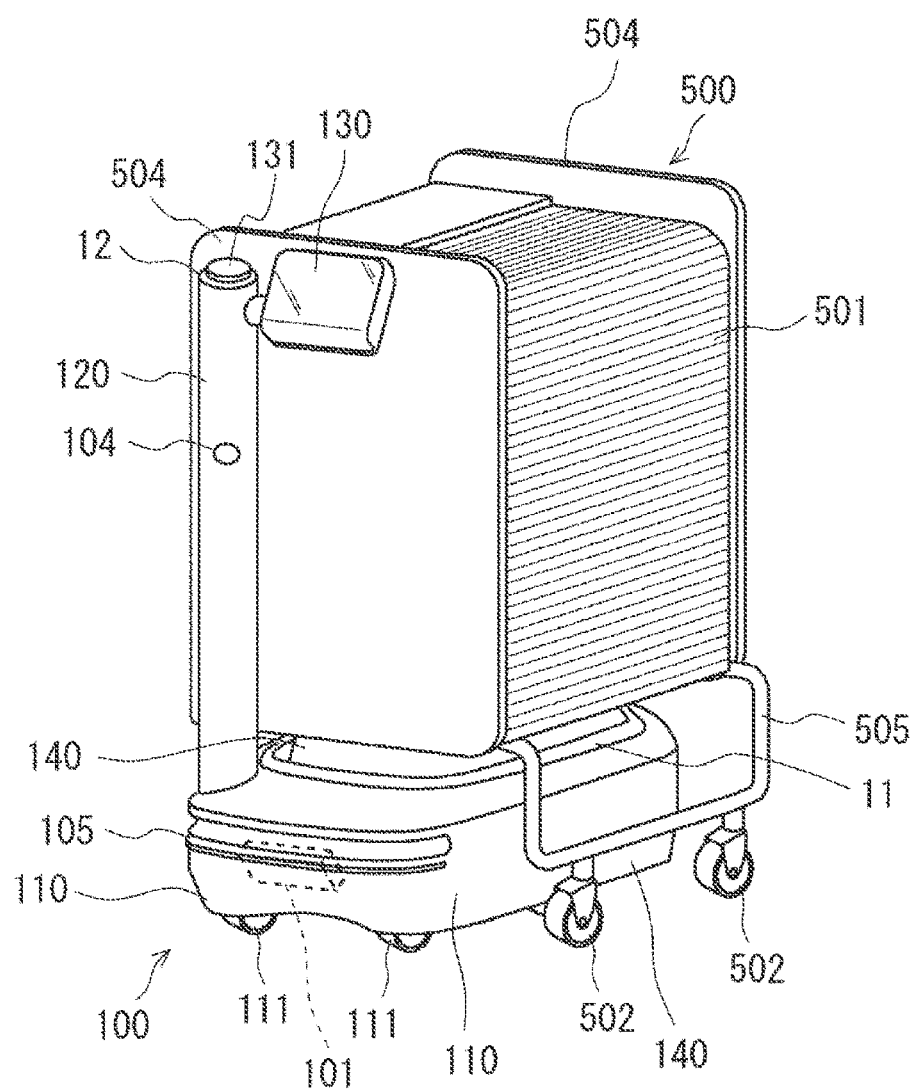
FIG. 3 is a perspective view of the mobile robot in FIG. 1 transporting the wagon in FIG. 2.

Next, details of the wagon 500 and an example of how the mobile robot 100 holds the wagon 500 will be described with reference to FIGS. 2 and 3. FIG. 3 is a perspective view of the mobile robot 100 transporting the wagon 500.

The wagon 500 includes a storage portion configured to store an article, and a support portion supporting the storage portion with a space under the storage portion to allow insertion of at least part of the platform 110. As shown in FIG. 2, the storage portion can include side plates 504 on both sides of the wagon 500 and a cover 501 that can be opened and closed. When the user opens the cover 501, an article loaded into the wagon can be unloaded from the wagon 500. As shown in FIG. 2, the support portion can include a support frame 505 supporting the storage portion, and wheels 502 attached to the lower side of the support frame 505. The wheels 502 may be provided with a cover, not shown.

The wagon 500 can be held by the lifting mechanism 140 of the mobile robot 100 as described above. The lifting mechanism 140 is a mechanism for loading and unloading the wagon 500 as a transport object onto and from the upper surface side of at least part of the platform 110. Since the mobile robot 100 includes the lifting mechanism 140, the mobile robot 100 can easily automatically transport the wagon 500.

As shown in FIG. 3, the mobile robot 100 can hold the wagon 500 by the lifting mechanism 140. The space to allow insertion of at least part of the platform 110 is a space S under the wagon 500 shown in FIG. 2. This space S is a space into which the platform 110 is to be inserted. That is, the platform 110 can enter the space S directly under the wagon 500. When loading the wagon 500 onto the platform 110, the mobile robot 100 moves in the −X direction and enters directly under the wagon 500. The platform 110 enters directly under the wagon 500 from the side in the front-rear direction on which the stand 120 is not installed. The wagon 500 can thus be loaded without the stand 120 interfering with the wagon 500. In other words, the stand 120 can be attached near the corner of the platform 110 so as not to interfere with the wagon 500.

As shown in FIG. 1, a contact portion of the lifting mechanism 140 can have recesses 141. The contact portion is a portion that contacts the bottom surface of the wagon 500 by, for example, coupling or connection when the wagon 500 loaded on the lifting mechanism 140 is transported. This contact portion can be the upper surface of the lifting mechanism 140. The wagon 500 can have protrusions, not shown, on the lower side of the storage portion. The wagon 500 can be fixed to the mobile robot 100 by fitting the protrusions into the recesses 141.

Although the wagon 500 is illustrated as a cart with the wheels 502, the form and configuration of the wagon 500 are not particularly limited. The predetermined wagon exemplified by the wagon 500 may be any wagon as long as it has a shape, size, and weight that are transportable by the mobile robot 100.

The operations of loading the wagon 500, transporting the wagon 500 to a transport destination, and unloading the wagon 500 by the mobile robot 100 will be described. First, regarding the loading of the wagon 500, the mobile robot 100 can be a mobile robot that is set in advance to transport the wagon 500 and moves in search of the wagon 500 or moves to a known position. For example, the wagon 500 whose position is specified by the user can be assigned to the mobile robot 100 as an object to be transported or an object to be searched for, and the mobile robot 100 can autonomously move in order to transport the wagon 500. Alternatively, the mobile robot 100 may automatically transport the wagon 500 to a transport destination when it finds the wagon 500 on the way back after finishing a task of transporting another wagon or an article. The present disclosure is not limited to these examples, and various methods can be applied to the utilization of the mobile robot 100 for transport of the wagon 500.

The mobile robot 100 moves to the position of the wagon 500, and the control computer 101 recognizes the wagon 500 based on information acquired by the camera 104 or other sensor, and controls the lifting mechanism 140 to load the wagon 500. This control to load the wagon 500 can also be referred to as pickup control.

In the pickup control, the platform 110 is first inserted into the space S directly under the wagon 500, and the lifting mechanism 140 is raised when the insertion is completed. The lifting stage that is the upper surface of the lifting mechanism 140 thus comes into contact with the wagon 500, so that the lifting mechanism 140 can lift the wagon 500. That is, as the lifting mechanism 140 rises, the wheels 502 are lifted off the floor surface, and the wagon 500 is loaded onto the platform 110. The mobile robot 100 is thus docked with the wagon 500 and becomes ready to head to the transport destination. The control computer 101 then controls driving of the wheels 111 etc. so that the mobile robot 100 moves autonomously along a set route. The mobile robot 100 thus transports the wagon 500 to the transport destination.

The mobile robot 100 moves to the transport destination of the wagon 500, and the control computer 101 controls the lifting mechanism 140 to unload the wagon 500. In this control, the lifting mechanism 140 is lowered to unload the wagon 500 from the platform 110. The wheels 502 come into contact with the floor surface, and the upper surface of the lifting mechanism 140 is separated from the wagon 500. The wagon 500 is thus placed on the floor surface. The wagon 500 can be unloaded from the platform 110 in this manner.

The above various examples are given on the assumption that the mobile robot 100 transports a wagon such as the wagon 500 as a transport object. However, even in the case where the mobile robot 100 is configured to transport a wagon, the mobile robot 100 may be utilized to transport an individual article (load) as a transport object. In that case, a storage box or shelf that keeps the article from falling while the mobile robot 100 is moving is preferably attached to the mobile robot 100.

There may be situations where the mobile robot 100 is utilized to transport a plurality of articles and it is necessary to transport the articles to a plurality of transport destinations. In this case, the user can unload the articles at the transport destinations regardless of whether the wagon 500 is used for transport. The mobile robot 100 can transport a wagon or an individual article(s) by autonomously moving to a set destination or by moving to a set destination according to user operations.

Figure 4:
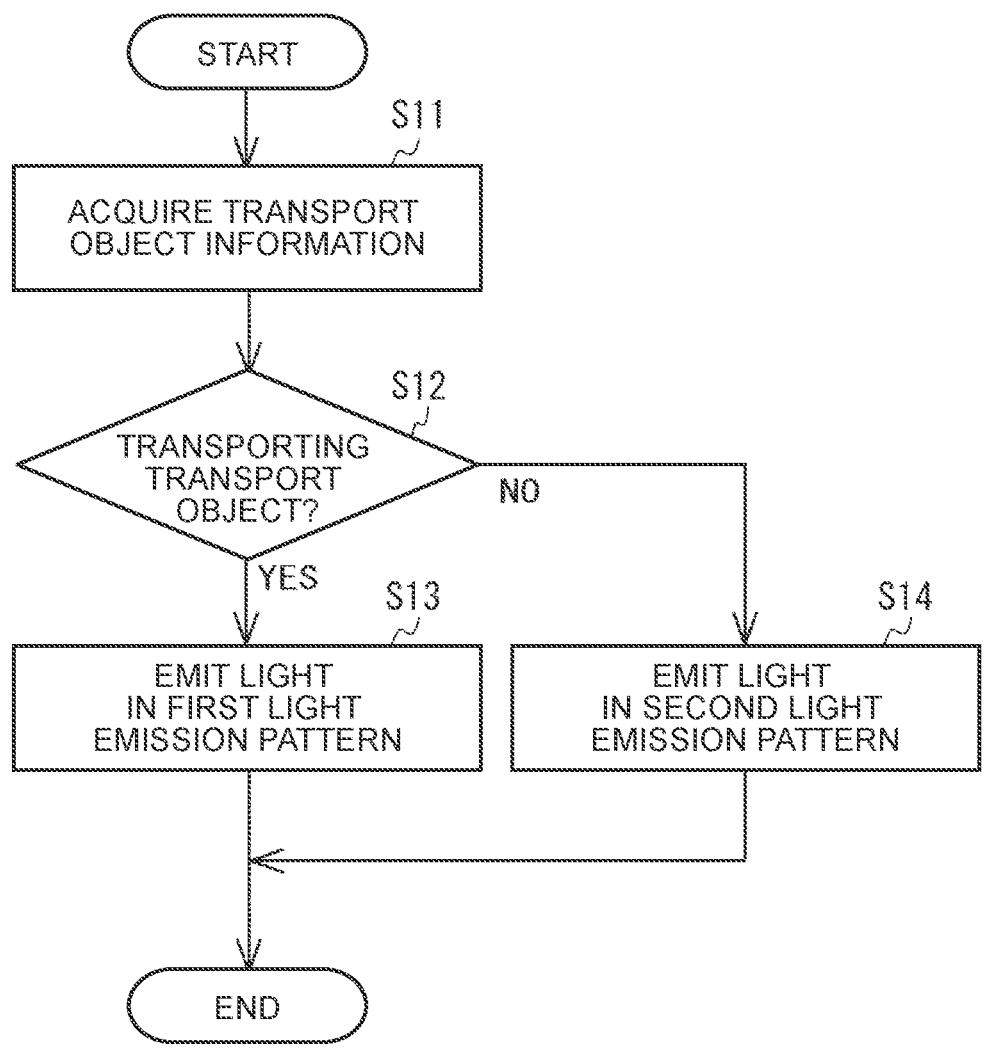
FIG. 4 is a flowchart illustrating an example of a light emission process that is performed by the mobile robot in FIG. 1.

Next, an example of a main feature of the present embodiment will be described with reference to FIGS. 4 and 5. FIG. 4 is a flowchart illustrating an example of a light emission process that is performed by the mobile robot 100. FIG. 5 shows an example of light emission patterns that can be implemented by the mobile robot 100.

As the main feature of the present embodiment, the mobile robot 100 includes light-emitting units exemplified by the first light-emitting unit 11 and the second light-emitting unit 12. An example in which the mobile robot 100 includes light-emitting units at two positions will be described below. However, the mobile robot 100 may include a light-emitting unit at one position or may include light-emitting units at three or more positions, and the position, shape, and size of each light-emitting unit are not limited to the illustrated example. From the viewpoint of visibility from the surroundings, the light-emitting units are preferably mounted at a plurality of positions away from each other, as exemplified by the first light-emitting unit 11 and the second light-emitting unit 12.

As at least part of the system control described above, the control computer 101 performs control to change the light emission pattern of the first light-emitting unit 11 and the second light-emitting unit 12 according to transport object information indicating whether the mobile robot 100 is transporting a transport object. The light emission pattern can also be referred to as "light emission mode."

For such control, the control computer 101 acquires the transport object information (step S11).

The control computer 101 determines, or acquires information as to, whether the wagon 500 etc. is loaded, based on information on the control to load the wagon 500 or based on the detection result from a weight sensor mounted on the lifting mechanism 140 or at a different position on the platform 110. In the case where the weight sensor is mounted, the control computer 101 can register the weight of each type of transport object in advance, and can calculate from the combination of the registered weights how many of which transport objects are loaded.

Alternatively, the control computer 101 may determine, or acquire information as to, whether the wagon 500 etc. is loaded, based on an image captured by a camera installed so as to include the lifting stage in its imaging range. Alternatively, the control computer 101 may determine, or acquire information as to, whether a transport object is being transported, based on information indicating a transport object set via the operation unit 130, a set or determined transport route, and current position information obtained from a position sensor etc. installed on the mobile robot 100. The method for acquiring the transport object information is not limited to these methods.

The mobile robot 100 can include in, for example, the control computer 101 a storage unit (not shown) configured to store the transport object information thus acquired. The control computer 101 can determine whether the mobile robot 100 is transporting a transport object, based on the stored transport object information.

After step S11, the control computer 101 determines whether the mobile robot 100 is transporting a transport object, based on the acquired transport object information (step S12).

When the mobile robot 100 is transporting a transport object, the control computer 101 controls the first light-emitting unit 11 and the second light-emitting unit 12 to emit light in a first light emission pattern such as that exemplified in "transport object" in FIG. 5 (step S13), and the process ends. When the mobile robot 100 is not transporting a transport object, the control computer 101 controls the first light-emitting unit 11 and the second light-emitting unit 12 to emit light in a second light emission pattern different from the first light emission pattern, such as that exemplified in "no transport object" in FIG. 5 (step S14), and the process ends. Such a process can be repeated, for example, when the transport object information is changed or at predetermined intervals.

As shown in the examples of "transport object" and "no transport object" in FIG. 5, light emission in a plurality of light emission patterns such as the first light emission pattern and the second light emission pattern can be performed in the same light-emitting area. Although FIG. 5 illustrates an example in which this same light-emitting area is both the first light-emitting unit 11 and the second light-emitting unit 12, this same light-emitting area may be either the first light-emitting unit 11 or the second light-emitting unit 12. This allows the user to easily notice an abnormality and to easily notice that an abnormality has been eliminated, because the portion that usually emits light in a normal mode emits light in a different mode.

The light emission patterns to be used, such as the first light emission pattern, the second light emission pattern, and other light emission patterns that will be described later, may be stored in the form of, for example, a table in the control computer 101 so that they can be referred to during light emission control. Examples of "priority transport object" and "transport object requiring attention" in FIG. 5 will be described later.

By performing such light emission control according to the transport object information, the mobile robot 100 can clearly notify the surroundings of the mobile robot 100 of whether the mobile robot 100 is transporting an object.

As described above, the first light-emitting unit 11 is a light-emitting unit mounted around the contact portion that may contact a transport object when the transport object is loaded and transported. That is, the light-emitting unit is mounted on the mobile robot 100 in consideration of the portion on which a transport object is to be loaded, as exemplified by the positional relationship between the first light-emitting unit 11 and the lifting stage. This contact portion can also be referred to as "loading surface." The first light-emitting unit 11 is mounted around the contact portion on the body of the mobile robot 100. This contact portion is a portion that contacts a transport object when the loaded transport object is transported. For example, a portion that contacts a transport object only during loading before transport of the transport object can be excluded from the contact portion. The contact portion can be, for example, a contact portion that contacts the bottom surface of a transport object. Therefore, a portion that contacts a side surface of a transport object can be excluded from the contact portion. Although possible transport objects include various transport objects with various sizes and shapes, the contact portion that may contact a transport object can refer to a portion that has a possibility of being in contact with a transport object during transport of the transport object, such as the upper surface of the lifting mechanism 140. Therefore, when the loaded wagon 500 or other loaded transport object is being transported, light emitted from the first light-emitting unit 11 is visible, for example, at least from obliquely above the mobile robot 100 or from the side of the mobile robot 100. The mobile robot 100 is easily visible from the surroundings even when the mobile robot 100 has a transport object loaded thereon, and is even more easily visible from the surroundings when the mobile robot 100 does not have any transport object loaded thereon. It is therefore possible to clearly notify the surroundings of the mobile robot 100 of whether the mobile robot 100 is transporting a transport object. In the case where light is emitted from the area around the contact portion as in this example and the wagon 500 is used for transport, the wagon 500 may have a mirror lower surface to make the light emission more visible to the surroundings of the mobile robot 100.

As described above, the second light-emitting unit 12 is a light-emitting unit mounted on or around a joystick device for operating the mobile robot 100. The light-emitting unit is mounted on the mobile robot 100 at a position high enough for the light-emitting unit to be easily visible from the operator or the surroundings, that is, at the operation position, as particularly exemplified by the second light-emitting unit 12. The mobile robot 100 can thus clearly notify the surroundings of whether the mobile robot 100 is transporting a transport object, even in a direction from which the loading position is less visible depending on the transport object such as the wagon 500.

Especially when the wagon 500 is used for transport, the inside of the wagon 500 is not visible from the operator. Therefore, the control computer 101 may perform control so as to indicate the presence or absence of a transport object in the wagon 500 by the difference in light emission pattern. The operator can thus be informed of useful information. In such control, the control computer 101 may not change the light emission pattern based on the presence or absence of the wagon 500 and may change the light emission pattern based only on the presence or absence of the contents of the wagon 500. Alternatively, the control computer 101 may change the light emission pattern based on the presence or absence of the wagon 500, and based on the presence or absence of the contents of the wagon 500 when the mobile robot 100 has the wagon 500 loaded thereon.

The control for changing the light emission pattern can include control for changing at least one of the brightness, hue, saturation, and lightness of light that is emitted from the light-emitting units such as the first light-emitting unit 11 and the second light-emitting unit 12. In an example in which the light-emitting units are mounted at a plurality of positions away from each other as exemplified by the first light-emitting unit 11 and the second light-emitting unit 12, the control for changing the light emission pattern can include control for controlling the first light-emitting unit 11 and the second light-emitting unit 12 to emit light with different light emission parameters from each other. As used herein, the light emission parameter can be at least one of the following: brightness, hue, saturation, and lightness.

In the example in which the light-emitting units are mounted at a plurality of positions away from each other as exemplified by the first light-emitting unit 11 and the second light-emitting unit 12, the control for changing the light emission pattern can include changing the light emission position. In a certain light emission pattern, light emission can be controlled so that light is emitted at all the positions. In another light emission pattern, light emission can be controlled so that light is turned off at all the positions. For example, the control for changing the light emission pattern can include control for turning off one of the first light-emitting unit 11 and the second light-emitting unit 12 and controlling only the other light-emitting unit to emit light, that is, control for turning on and off the light emission.

By using such various light emission patterns as described above, the mobile robot 100 can even more clearly notify the surroundings of whether the mobile robot 100 is transporting a transport object. For example, when there is a transport object, the control computer 101 may reduce light emission to save power. Alternatively, when there is a transport object, the control computer 101 may make light emission stand out to avoid light becoming less visible due to the presence of the transport object.

In the processing example shown in FIG. 4, it is assumed that whether the mobile robot 100 is transporting a transport object is determined based on whether the mobile robot 100 is transporting some kind of transport object regardless of what the transport object is, and the light emission pattern of the mobile robot 100 is changed according to the determination result, and that an object to be determined is a managed object. However, the object to be determined is not limited to this. Whether the mobile robot 100 is transporting some kind of transport object can also be determined when the mobile robot 100 is transporting an object different from an object to be transported, such as when (A) the mobile robot 100 is transporting supplies loaded on the mobile robot 100 by mistake, and (B) when the mobile robot 100 is transporting a child having accidentally stepped on the loading surface.

The control computer 101 can determine whether the mobile robot 100 is transporting some kind of transport object, based on, for example, the detection result from the weight sensor mounted on the lifting mechanism 140 or at a different position on the platform 110. In the case where the weight sensor is mounted, the control computer 101 can register the weight of each type of transport object in advance, and can calculate from the combinations of the registered weights how many of which transport objects are loaded, as described above. Therefore, even when supplies etc. are loaded on the mobile robot 100 by mistake as in the case (A), the control computer 101 can determine from the calculation result that the supplies etc. are loaded on the mobile robot 100. Moreover, even when an object other than managed objects is present on the mobile robot 100 such as in the case (B), the control computer 101 can detect that the object on the mobile robot 100 does not match any of the combinations and can thus determine that an object other than managed objects is present on the mobile robot 100.

Alternatively, the control computer 101 can determine whether the mobile robot 100 is transporting some kind of transport object even in the cases (A) and (B), based on an image captured by the camera installed so as to include the lifting stage in its imaging range as described above.

Even when the mobile robot 100 is transporting some kind of transport object, the control computer 101 performs step S14 in the following manner when the control computer 101 determines that this transport object is an object that is not supposed to be transported as in the cases (A) and (B).

As a first process example, the control computer 101 can determine that the mobile robot 100 is not transporting a transport object because the object being transported is not an object that is supposed to be transported. The control computer 101 can then control the first light-emitting unit 11 and the second light-emitting unit 12 to emit light in the second light emission pattern. In the first process example, the light emission pattern is only changed according to whether the mobile robot 100 is transporting a transport object identified as an object that is supposed to be transported. Alternatively, as a second process example, the control computer 101 can control the first light-emitting unit 11 and the second light-emitting unit 12 to emit light in the first light emission pattern, because the transport object being transported is not an object that is supposed to be transported but the mobile robot 100 is transporting a transport object anyway. Alternatively, as a third process example, the control computer 101 can control the first light-emitting unit 11 and the second light-emitting unit 12 to emit light in a different light emission pattern, because the transport object being transported is not an object that is supposed to be transported but the mobile robot 100 is transporting a transport object anyway. The different light emission pattern may be any light emission pattern different from the first light emission pattern and the second light emission pattern, and can be such a light emission pattern that can indicate an error or an abnormality.

In the various examples described above, the light emission pattern is changed to the one indicating that the mobile robot 100 is transporting a transport object at, for example, any one of the following timings (a), (b), and (c). These timings can also be applied to process examples that will be described later with reference to FIGS. 6 and 7.

(a) When a transport object is loaded onto the mobile robot 100. (b) When a transport object is loaded onto the mobile robot 100 and the mobile robot 100 starts moving. (c) When a specific condition is satisfied during traveling of the mobile robot 100, such as the following conditions (c-1), (c-2), and (c-3).

The condition (c-1) is that the mobile robot 100 is traveling in an area where it is preferable to indicate that the mobile robot 100 is transporting a transport object. The "area" refers to an area where the mobile robot 100 may move, and the control computer 101 can determine in which area the mobile robot 100 is traveling by comparing the map data and the current position of the mobile robot 100. Examples of the area where it is preferable to indicate that the mobile robot 100 is transporting a transport object include: areas where there is a person(s); areas where there is likely to be a person(s); areas where a non-staff member(s) stays or is likely to stay rather than staff-only areas among the areas where there is a person(s) or there is likely to be a person(s); and areas determined in advance to be transport areas. In this case, the control computer 101 controls light emission according to the type of the area where the mobile robot 100 moves. When the mobile robot 100 is traveling in the area where it is preferable to indicate that the mobile robot 100 is transporting a transport object, the control computer 101 controls the first light-emitting unit 11 and the second light-emitting unit 12 to emit light in the first light emission pattern indicating that the mobile robot 100 is transporting a transport object.

The condition (c-2) is that the presence of a person(s) to be notified has been confirmed and it is better to indicate that the mobile robot 100 is transporting a transport object. For example, the condition (c-2) is when the presence of a person(s) has been detected based on the detection results from the sensors mounted on the mobile robot 100 and sensors installed in the area such as an environment camera and the person(s) has been detected as a person(s) related to the transport object being transported, such as a recipient of the transport object, by face recognition or an identification (ID) tag(s) carried by the person(s). When the condition (c-2) is satisfied, the control computer 101 controls the first light-emitting unit 11 and the second light-emitting unit 12 to emit light in the first light emission pattern indicating that the mobile robot 100 is transporting a transport object.

The condition (c-3) is that an instruction to change the light emission pattern to the one indicating that the mobile robot 100 is transporting a transport object has been input to the mobile robot 100 via an interface such as user equipment. When the condition (c-3) is satisfied, the control computer 101 controls the first light-emitting unit 11 and the second light-emitting unit 12 to emit light in the first light emission pattern indicating that the mobile robot 100 is transporting a transport object.

Figure 6:
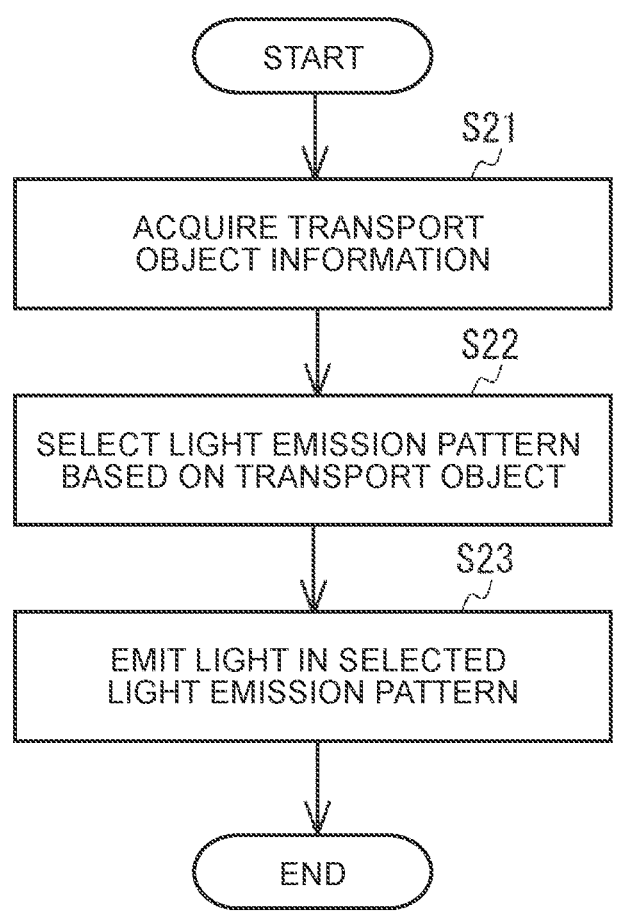
FIG. 6 is a flowchart illustrating another example of the light emission process that is performed by the mobile robot in FIG. 1.

Next, another example of the light emission process that can be used in the present embodiment will be described with reference to FIGS. 5 and 6. FIG. 6 is a flowchart illustrating another example of the light emission process that is performed by the mobile robot 100.

When the mobile robot 100 is transporting a transport object, the transport object information that is used for control by the control computer 101 can include information indicating the transport object being transported by the mobile robot 100. In this case, the control computer 101 performs, as the light emission control, control to change the light emission pattern of the first light-emitting unit 11 and the second light-emitting unit 12 according to the transport object indicated by the transport object information.

For such control, the control computer 101 acquires transport object information including information indicating the transport object being transported by the mobile robot 100 (step S21). The acquisition of the transport object information in this case can also be performed by a method that can also acquire the information indicating the transport object out of the methods described above.

That is, the control computer 101 can determine or acquire the information indicating the transport object based on the detection result from the weight sensor mounted on the lifting mechanism 140 or at a different position on the platform 110. Alternatively, the control computer 101 can determine or acquire the information indicating the transport object based on an image captured by the camera installed so as to include the lifting stage in its imaging range. For the transport object placed in the wagon 500, the control computer 101 can determine or acquire the information indicating the transport object based on an image captured by the camera while the user was placing the transport object into the wagon 500. Alternatively, the control computer 101 may determine or acquire the transport object being transported, based on information indicating a transport object set via the operation unit 130, a set or determined transport route, and current position information obtained from the position sensor etc. installed on the mobile robot 100. The method for acquiring the information indicating the transport object is not limited to these methods.

As described above, the mobile robot 100 can include in, for example, the control computer 101 a storage unit (not shown) configured to store the transport object information thus acquired. The control computer 101 can determine the transport object being transported, based on the stored transport object information. The transport object information to be stored may be information indicating a transport object to be transported and a transport object being transported.

After step S21, the control computer 101 selects a light emission pattern according to not only whether the mobile robot 100 is transporting a transport object but also the transport object being transported, based on the acquired transport object information (step S22). The control computer 101 then controls the first light-emitting unit 11 and the second light-emitting unit 12 to emit light in the selected light emission pattern (step S23), and the process ends. Such a process can be repeated, for example, when the transport object information is changed or at predetermined intervals.

In steps S22, S23, the control computer 101 can select a light emission pattern and perform the light emission control in, for example, the following manner. When the mobile robot 100 is not transporting a transport object, the first light-emitting unit 11 and the second light-emitting unit 12 are controlled to emit light in the second light emission pattern such as that exemplified by "no transport object" in FIG. 5. When the mobile robot 100 is transporting a transport object and the transport object is neither a priority transport object nor a transport object requiring attention that will be described later, the first light-emitting unit 11 and the second light-emitting unit 12 are controlled to emit light in the first light emission pattern such as that exemplified in "transport object" in FIG. 5.

When the mobile robot 100 is transporting a transport object and the transport object is a priority transport object that needs to be transported on a priority basis, the first light-emitting unit 11 and the second light-emitting unit 12 are controlled to emit light in a third light emitting pattern that stands out more than the first and second light emission patterns, such as that exemplified in "priority transport object" in FIG. 5. When the mobile robot 100 is transporting a transport object and the transport object is either an object requiring attention such as medicine or a transport object containing an object requiring attention, the first light-emitting unit 11 and the second light-emitting unit 12 are controlled to emit light in a fourth light emission pattern such as that exemplified in "transport object requiring attention" in FIG. 5. The fourth light emission pattern can be a light emission pattern that stands out more than at least the first and second light emission patterns and even more than the third light emission pattern.

The types of transport objects and the light emission patterns may have a one-to-one relationship. However, too many light emission patterns may confuse surrounding people. Therefore, the types of transport objects and the light emission patterns need not necessarily have a one-to-one relationship such as that exemplified in "priority transport object" and "transport object requiring attention" in FIG. 5.

As in the example described with reference to FIGS. 5 and 6, the mobile robot 100 can change the light emission pattern according to the transport object. The mobile robot 100 can thus clearly notify the surroundings of the content of the transport object information, such as whether the mobile robot 100 is transporting a transport object, and when the mobile robot 100 is transporting a transport object, information on the article being transported.

In the example in which the light-emitting units are mounted at a plurality of positions away from each other as exemplified by the first light-emitting unit 11 and the second light-emitting unit 12, the control for changing the light emission pattern can include changing of a plurality of positions where light is synchronously emitted. With such a configuration, the mobile robot 100 can more clearly notify the surroundings of the mobile robot 100 of the content of the transport object information.

Examples of such light emission patterns will be described. In a certain light emission pattern, only the first light-emitting unit 11 is controlled to emit light. In another light emission pattern, only the second light-emitting unit 12 is controlled to emit light. In still another light emission pattern, the first light-emitting unit 11 and the second light-emitting unit 12 are synchronized to emit light. Examples of synchronizing the first light-emitting unit 11 and the second light-emitting unit 12 to emit light include the example of "no transport object" and the example of "transport object" in FIG. 5. In an example in which the mobile robot 100 includes light-emitting units at three or more positions, a light emission pattern can be selected from many light emission patterns obtained from various combinations of the three or more light-emission units.

Examples of controlling the first light-emitting unit 11 and the second light-emitting unit 12 to emit light without synchronizing them include the example of "priority transport object" and the example of "transport object requiring attention" in FIG. 5. In the example of "priority transport object" in FIG. 5, the first light-emitting unit 11 and the second light-emitting unit 12 are shown hatched in opposite directions, but such hatching is merely for convenience and indicates that these light-emitting units are different from each other only in phase. The same applies to the example of "transport object requiring attention" in FIG. 5. In the case where the first light-emitting unit 11 and the second light-emitting unit 12 are controlled to emit light alternately, these examples can be regarded as examples in which the timing to turn on the first light-emitting unit 11 and the timing to turn off the second light-emitting unit 12 are synchronized. As described above, the control computer 101 can control, as a certain light emission pattern, light emission of the first light-emitting unit 11 and the second light-emitting unit 12 so that they emit light at alternate timings, namely so that they emit light alternately.

The control computer 101 need not necessarily control light emission so that the first light-emitting unit 11 and the second light-emitting unit 12 emit light at alternate timings. The control computer 101 may control, as a certain light emission pattern, the first light-emitting unit 11 and the second light-emitting unit 12 to emit light out of phase from each other. Light emission can thus be presented in various rhythms to the surroundings.

At a plurality of positions where light is synchronously emitted, light may be emitted in a light emission pattern having a mutually complementary relationship. The "light emission pattern having a mutually complementary relationship" can be a pattern in which the first light-emitting unit 11 and the second light-emitting unit 12 are controlled to emit light in colors that are easily visible when seen as a combination, such as a pattern in which the first light-emitting unit 11 and the second light-emitting unit 12 are controlled to emit light in complementary colors.

As described above, the light emission control can be performed by regarding the wagon 500 itself as a transport object, or the light emission can be performed by regarding an article in the wagon 500 as a transport object. When the wagon 500 is not used, the light emission control can be performed by regarding an individual article as a transport object. For example, the control computer 101 may regard the wagon 500 itself as a transport object and perform the light emission control according to the presence or absence of the wagon 500. Alternatively, the control computer 101 may perform the light emission control according to whether an article is in the wagon 500. Alternatively, the control computer 101 may perform the light emission control according to the article or combination of articles in the wagon 500, or may perform a combination of two or more light emission controls out of the various light emission controls described above.

When the mobile robot 100 performs the light emission control by regarding the wagon 500 itself as a transport object, the transport system can be configured to handle a plurality of types of transport boxes exemplified by the wagon 500 as objects to be transported. In this case, when the mobile robot 100 is transporting a transport object, the transport object information preferably includes information indicating the type of the transport box being transported by the mobile robot 100. The control computer 101 can thus control the first light-emitting unit 11 and the second light-emitting unit 12 to emit light in different light emission patterns depending on the type of transport box. With such a configuration, the mobile robot 100 can clearly notify the surroundings of the mobile robot 100 of the type of the transport box being transported.

Next, other examples of the light emission process that can be used in the present embodiment will be described with reference to FIGS. 7 to 9. FIG. 7 is a flowchart illustrating still another example of the light emission process that is performed by the mobile robot 100. FIGS. 8 and 9 show other examples of the light emission patterns that can be implemented by the mobile robot 100.

Information that is used by the control computer 101 for the light emission control can also include information other than the transport object information. An example in which the information that is used by the control computer 101 for the light emission control includes state information indicating the state of the mobile robot 100 will be described below. The state information can be, for example, information indicating whether the mobile robot 100 is in the autonomous movement mode, is in the user operation mode, or has some kind of abnormality. An example will be given below in which, when the mobile robot 100 has an abnormality, light emission is controlled so that light is emitted in the same light emission pattern regardless of whether the mobile robot 100 is in the autonomous movement mode or in the user operation mode. However, when the mobile robot 100 has an abnormality, light emission may be controlled so that light is emitted in different light emission patterns depending on whether the mobile robot 100 is in the autonomous movement mode or in the user operation mode.

The state information can include either or both of information indicating the traveling state associated with the traveling environment of the mobile robot 100 and information indicating the operating state of the mobile robot 100. The "traveling state" can refer to, for example, whether a traveling abnormality associated with the traveling environment such as contact with a wall has occurred in the mobile robot 100. For convenience, the "operating state" herein refers to a state other than the state of the mode indicating whether the mobile robot 100 is in the autonomous movement mode or the user operation mode. The "operating state" is herein described as indicating whether there is some kind of operational abnormality or indicating what the operational abnormality is. As used herein, the "operational abnormality" can refer to abnormalities other than abnormalities in the traveling state associated with the traveling environment of the mobile robot 100, and can refer to various abnormalities of the mobile robot 100, such as a dead battery, an abnormality in a drive unit, and an abnormality in any wheel.

For such control, the control computer 101 acquires transport object information in the same manner as in step S21 of FIG. 6 (step S31), and acquires state information (step S32). The order of steps S31, S32 does not matter. In step S32, information indicating whether the mobile robot 100 is in the autonomous movement mode or the user operation mode out of the state information can be obtained by referring to the current movement mode of the control computer 101.

Information on whether the mobile robot 100 has an abnormality out of the state information can be acquired in, for example, the following manner. The control computer 101 first determines the traveling state of the mobile robot 100 based on the detection results from sensors such as the sensor 105, and determines the operating state indicating the presence or absence of an operational abnormality in the mobile robot 100. The order in which the traveling state and the operating state are determined does not matter. The determination of the operating state is made as to, for example, whether there is any operational abnormality, and where is the location of the abnormality, such as the battery, the drive unit, or any wheel. For example, this determination can be made by the control computer 101 based on the detection results from various sensors mounted on the mobile robot 100.

The determination of the traveling state can be made by the control computer 101 performing information processing, image processing, etc. based on the detection results from the sensors such as the sensor 105. The following description is given on the assumption that the determination is made in this manner. The sensors may have a function to make such a detection that the result of the detection indicates the determination result itself of the traveling state, or to determine the traveling state by performing information processing, image processing, etc. based on the sensing result. In that case, the sensors send the determination result to the control computer 101, and the control computer 101 can use the information received from the sensors as the determination result of the traveling state. The determination of the traveling state may be made by a determination unit provided separately from the control computer 101 that performs the light emission control.

Like the determination of the traveling state, the determination of the operating state can also be made by the control computer 101 performing information processing, image processing, etc. based on the detection results from the various sensors. The following description is given on the assumption that the determination is made in this manner. The sensors may have a function to make such a detection that the result of the detection indicates the determination result itself of the operating state, or to determine the operating state by performing information processing, image processing, etc. based on the sensing result. In that case, the sensors send the determination result of the operating state to the control computer 101, and the control computer 101 can use the information received from the sensors as the determination result of the operating state. The determination of the operating state may be made by a determination unit provided separately from the control computer 101 that performs the light emission control.

The mobile robot 100 can include in, for example, the control computer 101 a storage unit (not shown) configured to store the state information thus acquired. In step S32, the control computer 101 can refer to the stored state information.

After steps S31, S32, the control computer 101 selects a light emission pattern based on the acquired transport object information and state information (step S33). The control computer 101 then controls the first light-emitting unit 11 and the second light-emitting unit 12 to emit light in the selected light emission pattern (step S34), and the process ends. Such a process can be repeated, for example, when the transport object information or the state information is changed or at predetermined intervals.

In steps S33, S34, the control computer 101 can select a light emission pattern and perform the light emission control in, for example, the following manner. An example will be given in which the process of FIG. 7 is repeated at predetermined intervals. For example, the control computer 101 can switch the correspondence it refers to between the correspondence between the transport objects and the light emission patterns shown in FIG. 8 and the correspondence between the states and the light emission patterns shown in FIG. 9, every time the process is repeated, that is, every predetermined period indicated by the predetermined interval. For example, the control computer 101 controls the first light-emitting unit 11 and the second light-emitting unit 12 to emit light in a light emission pattern indicating the transport object in steps S33, S34, based on the correspondence between the transport objects and the light emission patterns shown in FIG. 8. After the predetermined period, the control computer 101 controls the first light-emitting unit 11 and the second light-emitting unit 12 to emit light in a light emission pattern indicating the state in steps S33, S34, based on the correspondence between the states and the light emission patterns shown in FIG. 9.

In FIG. 8, the light emission patterns defined by the colors and turn-on patterns of light emission from the first light-emitting unit 11 and the second light-emitting unit 12 are exemplified for each of the cases of "no transport object," "transport object," "priority transport object," and "transport object requiring attention" that are the same as in the example of FIG. 5. The turn-on pattern is selected from an always-on pattern in which light is constantly on, a flashing pattern in which light flashes at short intervals, a flashing pattern in which light flashes at normal intervals longer the short intervals, and a flashing pattern in which light flashes at intervals longer than the normal intervals. The intervals at which light flashes, that is, the flashing intervals, may be in two stages or in four or more stages.

In FIG. 9, the light emission patterns defined by the colors and turn-on patterns of light emission from the first light-emitting unit 11 and the second light-emitting unit 12 are exemplified for each of the cases of "autonomous movement mode and normal," "user operation mode and normal," and "abnormal." As can be seen from the example of the light emission patterns shown in FIG. 9, the second light-emitting unit 12 near the operation unit 130 and the stick unit 131 mainly indicates the mode when the mobile robot 100 is normal and an abnormality in the mobile robot 100, and the first light-emitting unit 11 indicates also the detailed operating state of the mobile robot 100 in the autonomous movement mode.

In FIG. 9, the case of "autonomous movement mode and normal" is divided into the following four cases as the detailed operating state in the autonomous movement mode. That is, FIG. 9 show an example of the light emission patterns for the following four cases: "traveling autonomously" indicating that the mobile robot 100 is moving autonomously, "on standby" indicating that the mobile robot 100 is under autonomous movement control but is stopped on standby, "prompt an operation" indicating a situation where the user is prompted to perform some kind of operation, and "alert" indicating a situation where some kind of alert is given to the user or the surroundings. The case of "on standby" can refer to, for example, the case where the mobile robot 100 is being charged with a charger or is waiting for an elevator. The case of "prompt an operation" can refer to, for example, the case where the mobile robot 100 has arrived at a transport destination. The case of "alert" can refer to, for example, the case where the lifting mechanism 140 is being raised or lowered or the case where the mobile robot 100 is approaching an intersection. The case of "traveling autonomously" refers to the other cases where the vehicle is traveling autonomously.

FIG. 9 also shows an example of the turn-on patterns including a "breathing rhythm" in which the brightness of light emission is changed in a rhythm similar to the rhythm of human breathing, and "sequential lighting" in which the light-emitting portions are turned on in a sequence. Examples of the sequential lighting include controlling the first light-emitting unit 11 to sequentially turn on its light-emitting portions around the lifting mechanism 140 and controlling the second light-emitting unit 12 to sequentially turn on its light-emitting portions around the stick unit 131.

As another example of the light emission control, light may be emitted in the light emission patterns shown in FIG. 8 in half of the area illustrated as the first light-emitting unit 11 and half of the area illustrated as the second light-emitting unit 12. In that case, light can be emitted in the light emission patterns shown in FIG. 9 in the other half of the area illustrated as the first light-emitting unit 11 and the other half of the area illustrated as the second light-emitting unit 12. In the above example, each of the light-emitting areas of the first light-emitting unit 11 and the second light-emitting unit 12 is divided in half. However, the ratio for dividing the light-emitting area is not limited to this, and the light-emitting area may be divided at different ratios between the first light-emitting unit 11 and the second light-emitting unit 12.

As still another example of the light emission control, the first light-emitting unit 11 may be controlled to emit light in a light emission pattern according to the transport object as shown in FIG. 8, and the second light-emitting unit 12 may be controlled to emit light in a light emission pattern according to the state as shown in FIG. 9. Alternatively, the first light-emitting unit 11 may be controlled to emit light in a light emission pattern according to the state as shown in FIG. 9, and the second light-emitting unit 12 may be controlled to emit light in a light emission pattern according to the transport object as shown in FIG. 8.

Regarding the still another example of the light emission control, the control computer 101 may be configured to switch the light emission mode between or among a plurality of modes such as the mode in which light is emitted in the light emission patterns shown in FIG. 8 and the mode in which light is emitted in the light emission patterns shown in FIG. 9. In the mode in which light is emitted in the light emission patterns shown in FIG. 8, the light emission control is performed according to the transport object information. In the mode in which light is emitted in the light emission patterns shown in FIG. 9, the light emission control is performed according to the state information. As yet another example of the light emission control, the light emission patterns shown in FIG. 8 may be used for the light emission control on the first light-emitting unit 11 and the second light-emitting unit 12, and the light emission patterns shown in FIG. 9 may be used for the light emission control on other two light-emitting units provided at positions other than the first light-emitting unit 11 and the second light-emitting unit 12.

The examples of the colors and turn-on patterns shown in FIGS. 8 and 9 are applicable to such process examples as described with reference to FIGS. 4 to 6.

The configuration in which the mobile robot 100 includes a joystick device for operating the mobile robot 100 is described above. In this configuration, a control unit (exemplified by the control computer 101) provided in the mobile robot 100 other than in the joystick device preferably basically send a control signal for the light emission control to the first light-emitting unit 11 and the second light-emitting unit 12. However, a control unit (not shown) included in the joystick device may output a control signal for the light emission control to the first light-emitting unit 11 and the second light-emitting unit 12. In that case, the control computer 101 may make a determination as to a predetermined condition etc. for the light emission control and send the result of the determination to the control unit included in the joystick device, or the control unit included in the joystick device may make a determination as to the predetermined condition etc. for the light emission control.

The above description illustrates an example in which the transport system is mainly composed of the mobile robot 100. However, the control system according to the present embodiment may be any system as long as it performs system control for controlling the transport system in the manner described above. This transport system may also include a server that is connectable to the mobile robot 100 via wireless communication. This server is a server that provides information for autonomous movement to the mobile robot 100. This server can also be referred to as "host management device," and is not limited to a server configured as a single device, but may be constructed as a system in which functions are distributed between or among a plurality of devices.

Figure 10:
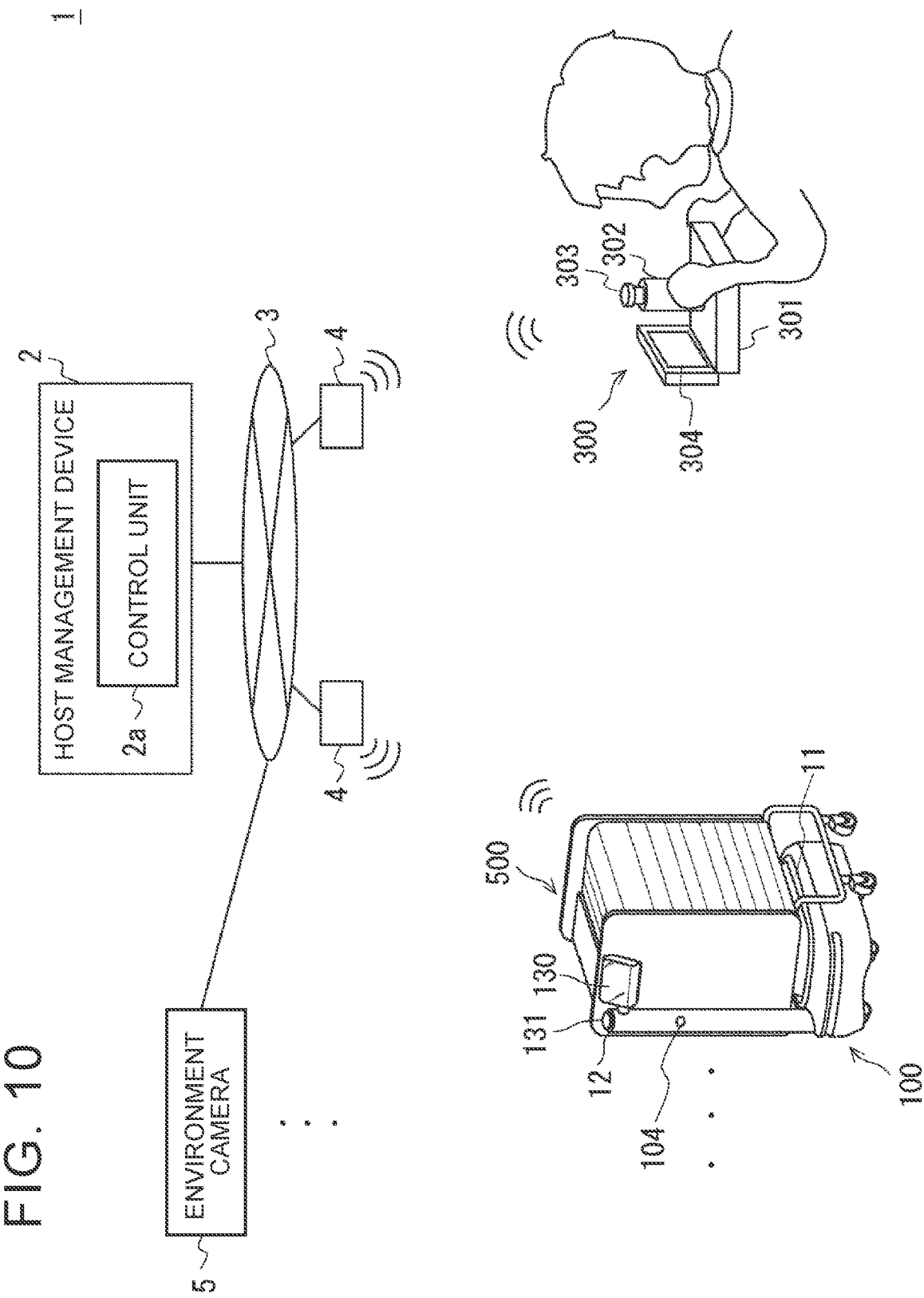
FIG. 10 is a schematic diagram showing an example of the overall configuration of a system including the mobile robot according to the embodiment.

An example in which this transport system includes the mobile robot 100 and the host management device will be described below with reference to FIG. 10. FIG. 10 is a schematic diagram showing an example of the overall configuration of the transport system including the mobile robot 100.

As shown in FIG. 10, a transport system 1 includes the mobile robot 100, a host management device 2, a network 3, a communication unit 4, an environment camera 5, and user equipment 300. The transport system 1 is a system for transporting an object by the mobile robot 100, and includes a control system according to this configuration example. In this example, the "control system" can refer to the mobile robot 100 and the host management device 2, or to the components of control systems provided in the mobile robot 100 and the host management device 2. Alternatively, the "control system" can refer to, for example, the mobile robot 100, the host management device 2, and the user equipment 300, or to the components of control systems provided in the mobile robot 100, the host management device 2, and the user equipment 300.

The mobile robot 100 and the user equipment 300 are connected to the host management device 2 via the communication unit 4 and the network 3. The network 3 is a wired or wireless local area network (LAN) or wide area network (WAN). The host management device 2 and the environment camera 5 are connected to the network 3 by wire or wireless. As can be seen from this configuration, each of the mobile robot 100, the host management device 2, and the environment camera 5 includes a communication unit. The communication unit 4 is, for example, a wireless LAN unit installed in each environment. The communication unit 4 may be a general-purpose communication device such as a WiFi (registered trademark) router.

The host management device 2 is a device that is connectable to the mobile robot 100 by wireless communication and is a management system that manages a plurality of mobile robots 100. The host management device 2 can include a control unit 2a for controlling the mobile robots 100. The control unit 2a can be implemented by, for example, integrated circuitry, and can be implemented by, for example, a processor such as an MPU or a CPU, a working memory, and a nonvolatile storage device. The function of the control unit 2a can be performed by the storage device storing a control program to be executed by the processor and the processor loading the program into the working memory and executing the program. The control unit 2a can be referred to as "control computer."

The transport system 1 can efficiently control the mobile robots 100 while autonomously moving the mobile robots 100 in the autonomous movement mode inside a predetermined facility. The "facility" can refer to various types of facilities including medical and welfare facilities such as hospitals, rehabilitation facilities, nursing homes, and residential care homes for the elderly, commercial facilities such as hotels, restaurants, office buildings, event venues, and shopping malls, and other complex facilities.

In order to perform such efficient control, a plurality of environment cameras 5 can be installed inside the facility. Each environment camera 5 acquires an image of the range in which a person or the mobile robot 100 moves, and outputs image data representing the image. This image data may be still image data or moving image data. In the case of the still image data, the still image data is obtained at each imaging interval. In the transport system 1, the host management device 2 collects the images acquired by the environment cameras 5 and information based on these images. As for the images that are used to control the mobile robots 100, the images etc. acquired by the environment cameras 5 may be directly sent to the mobile robots 100, and in the user operation mode, may be sent to the user equipment 300 directly or via the host management device 2. The environment cameras 5 can be installed as surveillance cameras in passages inside the facility or at entrances to the facility.

The host management device 2 can determine, for each transport request, the mobile robot 100 to perform the transport task, and can send to the determined mobile robot 100 an operation command to perform the transport task. The mobile robot 100 can autonomously move from a transport origin to a transport destination according to the operation command. In this case, a transport route etc. may be determined by any method.

For example, the host management device 2 assigns the transport task to the mobile robot 100 located at or near the transport origin. Alternatively, the host management device 2 assigns the transport task to the mobile robot 100 heading towards or near the transport origin. The mobile robot 100 to which the task has been assigned moves to the transport origin to pick up a transport object.

The user equipment 300 is a device that remotely operates the mobile robot 100 via the host management device 2 or directly when in the user operation mode. The user equipment 300 can have a communication function for this remote operation, and can include a display unit 304. When the user equipment 300 is a device that remotely operates the mobile robot 100 via the host management device 2, the user equipment 300 can also be said to be a remote operation device for the host management device 2. Various types of terminals such as a tablet computer and a smartphone can be used as the user equipment 300. The user equipment 300 can also receive a switching operation to switch between the user operation mode and the autonomous movement mode. When this switching operation is performed, the mode of the mobile robot 100 can be switched via the host management device 2.

An example will be given below in which the user equipment 300 includes a joystick device. The user equipment 300 can include a stick unit 302 and a button 303 as part of the joystick device, in addition to a body 301. The joystick device is a device that is operated to move the mobile robot 100 in a direction intended by the user when in the user operation mode. The joystick device can receive a directional operation when the stick unit 302 is tilted in a direction in which the user wants the mobile robot 100 to move. The button 303 can be provided on, for example, the upper surface of the stick unit 302. The joystick device can also be controlled to perform a select operation when the button 303 is depressed. The button 303 can also be used to perform the switching operation described above. The button 303 may be configured to serve as an emergency stop button when it is depressed for a predetermined period. In the case where a plurality of operations is assigned to the button 303, predetermined periods corresponding to the operations need only be set for the button 303. In the case where the user equipment 300 includes a joystick device, the user can perform similar operations even when the mobile robot 100 does not include a joystick device. It is herein assumed that, in the configuration in which the transport system 1 manages a plurality of mobile robots 100, the mobile robot 100 to be remotely operated can be selected by the user equipment 300 when in the user operation mode.

The display unit 304 can display an image indicated by image data received from the camera 104 of the mobile robot 100 and an image indicated by image data received from the environment camera 5 located around the mobile robot 100. This allows the user to operate the mobile robot 100 using the stick unit 302 and the button 303.

The user equipment 300 can function as a device for sending a transport request etc. to the host management device 2. This transport request can include information indicating a transport object.

In the transport system 1 configured as described above, the host management device 2 preferably outputs a control signal for the light emission control regardless of whether a joystick device is provided in the mobile robot 100, the user equipment 300, or both. In the case where the host management device 2 outputs the control signal, the control unit 2a can output the control signal. In that case, the control unit 2a of the host management device 2 preferably makes a determination etc. for acquiring various types of information for the light emission control. However, the control computer 101 may make this determination etc. and send the result of the determination etc. to the host management device 2, or the control unit included in the joystick device may make this determination etc. and send the result of the determination etc. to the host management device 2.

Alternatively, the transport system 1 can be configured so that the control unit (not shown) included in the joystick device outputs a control signal for the light emission control. In the case where a joystick device is provided in either the mobile robot 100 or the user equipment 300, the control unit of the joystick device can output the control signal. In the case where a joystick device is provided in both the mobile robot 100 and the user equipment 300, the control unit of either joystick device may output the control signal, or the control unit of the joystick device provided in the mobile robot 100 may output the control signal to the light-emitting unit mounted on or around the joystick device.

Alternatively, in the transport system 1 configured as described above, the control unit (exemplified by the control computer 101) provided in the mobile robot 100 may be configured to output a control signal for the light emission control. In that case, the control computer 101 preferably makes a determination etc. for acquiring various types of information for the light emission control. However, the control unit 2a of the host management device 2 or the control unit included in the joystick device may make this determination etc. and send the result of the determination etc. to the mobile robot 100. Instead of the transport system 1, a transport system can be configured not to include the host management device 2. In the case of this configuration, the control unit of the mobile robot 100 exemplified by the control computer 101 can make a determination etc. for acquiring various types of information and output a control signal for the light emission control. However, for example, the control unit included in the joystick device of the mobile robot 100 may make a determination as to a predetermined condition etc. and output a control signal for the light emission control.

The control system in the transport system 1 can perform the following control at least when the host management device 2 is unable to communicate with the mobile robot 100. When the host management device 2 is unable to communicate with the mobile robot 100, the control system can determine transport object information based on an image of the mobile robot 100 captured by the environment camera 5, namely can determine transport object information from the light emission pattern shown by the image. This image can be an image captured by a camera of another mobile robot included in the transport system 1, instead of or in addition to the image captured by the environment camera 5.

In the control system of the transport system 1 having such a configuration, the host management device 2 can determine the content of transport object information even when the mobile robot 100 and the host management device 2 are unable to communicate with each other. As described above, the "content of the transport object information" can include whether the mobile robot 100 is transporting a transported object, and when the mobile robot 100 is transporting a transported object, the content of the transport object information can also include the article etc.

Accordingly, for example, when the mobile robot 100 that is unable to communicate has a transport object loaded thereon or has an urgent transport object loaded thereon, an instruction to, for example, collect the transport object and deliver it to a transport destination can be given to the user, and the user can perform such work according to the instruction.

A method by which the mobile robot 100 acquires transport object information will be described. In the transport system 1 as well, the mobile robot 100 can acquire transport object information by the method described with reference to FIG. 1 etc.

As another acquisition method, the mobile robot 100 can determine transport object information from an image captured by the environment camera 5 and sent to the mobile robot 100 directly or via the host management device 2. An image captured by a camera of another mobile robot rather than the environment camera 5 may be used for the determination. In other words, the control computer 101 can determine transport object information based on an image captured by a camera installed in a facility where the mobile robot 100 is used, as exemplified by the environment camera 5 or the camera of another mobile robot. The control unit 2a of the host management device 2 can also make such a determination. In this case, transport object information is preferably sent in advance to the mobile robot 100 in case of interruption of wireless communication with the host management device 2.

As an acquisition method other than the above methods, the mobile robot 100 can acquire transport object information from the host management device 2. In the case where the mobile robot 100 acquires transport object information from the host management device 2, the host management device 2 need only update the transport object information according to the transport status. For example, the host management device 2 can update transport object information by receiving information indicating the current position of the mobile robot 100 or information indicating the transport status of the transported object from the mobile robot 100 or by determining transport object information from an image obtained by the environment camera 5.

Even in the configuration in which the mobile robot 100 acquires transport object information from the host management device 2, the mobile robot 100 can acquire the transport object information before communication with the host management device 2 is interrupted. Therefore, the mobile robot 100 can perform the light emission control according to the transport object information obtained before communication is interrupted.

Figure 11:
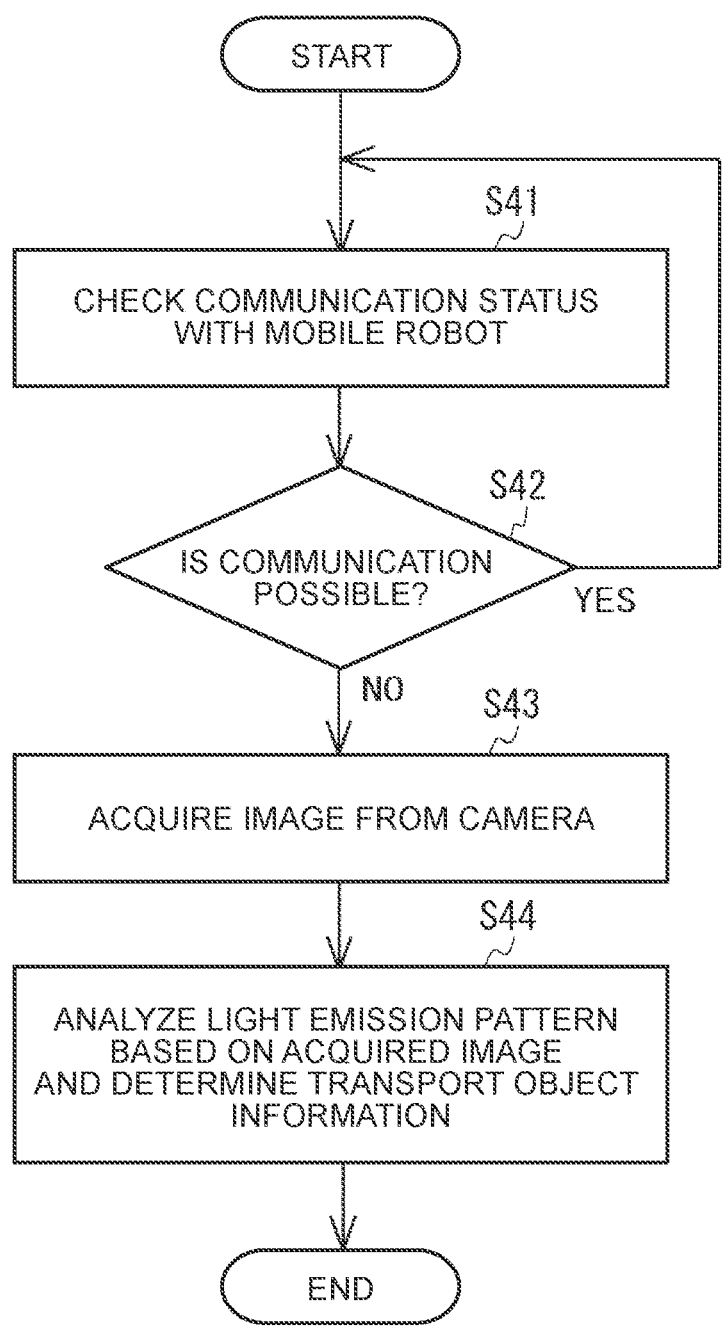
FIG. 11 is a flowchart illustrating an example of a process that is performed by a host management device in the system in FIG. 10.

An example of a process that is performed by the host management device 2 of the transport system 1 will be described with reference to FIG. 11. FIG. 11 is a flowchart illustrating an example of the process that is performed by the host management device 2 of the transport system 1 in FIG. 10.

First, the control unit 2a of the host management device 2 monitors the communication unit, not shown, to check the communication status with the mobile robot 100 (step S41), and determines whether communication with the mobile robot 100 is possible (step S42). When the control unit 2a determines that communication with the mobile robot 100 is possible, the process returns to step S41 and continues to monitor the communication unit. When the control unit 2a determines that communication with the mobile robot 100 is not possible, the control unit 2a acquires an image from a camera (step S43). This camera can be the environment camera 5, the camera installed in another mobile robot traveling near the position where communication with the mobile robot 100 is interrupted, or both of them.

The control unit 2a then analyzes the light emission pattern of the mobile robot 100 based on the acquired image and determines transport object information such as the presence or absence of a transport object and the type of the transport object (step S44), and the process ends. The control unit 2a may be configured to obtain transport object information from an image using a learning model obtained through machine learning, when analyzing the light emission pattern and determining transport object information.

As described above, even when communication between the mobile robot 100 and the host management device 2 is not possible, the host management device 2 of the control system of the transport system 1 can determine the content of the transport object information the mobile robot 100 presents by the light emission pattern.

In the configuration in which the mobile robot 100 can indicate its state information by the light emission pattern, the control unit 2a can determine the state information of the mobile robot 100 from the light emission pattern shown by the image. The control unit 2a may be configured to obtain state information from an image using a learning model obtained through machine learning, when analyzing the light emission pattern and determining state information. Accordingly, for example, when the mobile robot 100 that is unable to communicate is in an abnormal state, an instruction to, for example, collect or inspect the mobile robot 100 can be given to the user, and the user can perform such work according to the instruction.

Even in a configuration in which the transport system does not include the host management device 2, the transport system can include the environment camera 5 can wirelessly communicate with the mobile robot 100. Even in such a configuration example, transport object information and state information can be similarly determined from an image obtained from the environment camera 5.

The above description is given based on an example in which the mobile robot 100 and the user equipment 300 are equipped with a joystick device as an operation interface for performing operations to move the mobile robot 100. However, various other types of operation interfaces may be used as the operation interface. For example, an operation device that receives operations to move the mobile robot 100 from a user interface displayed using software as exemplified for the operation unit 130 may be used as the operation interface. The light-emitting unit can also be implemented by displaying a light emission pattern on the user interface. The operation interface can be, for example, a touch sensor or an operation device with a touch sensor. The operation interface can receive an operation to move the mobile robot 100 as the user slides a finger on the touch sensor.

Figure 12:
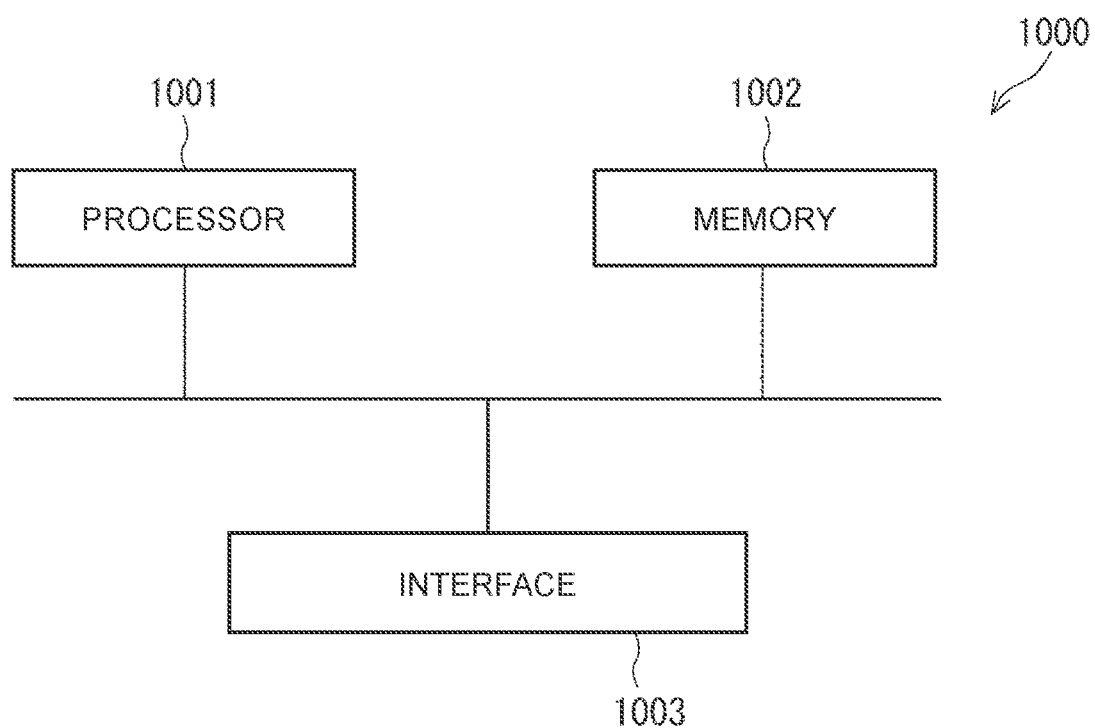
FIG. 12 shows an example of the hardware configuration of a device.

Each of the various devices described above such as the control computer 101 of the mobile robot 100, the host management device 2, and the user equipment 300 according to the above embodiment can have, for example, the following hardware configuration. Alternatively, the operation device such as the joystick device provided in, for example, the mobile robot 100 or the user equipment 300 can include the following hardware configuration. FIG. 12 shows an example of the hardware configuration of each device.

A device 1000 shown in FIG. 12 can include a processor 1001, a memory 1002, and an interface 1003. The interface 1003 can include, for example, a communication interface and an interface with a drive unit, a sensor, an input and output device, etc. as necessary for the individual device.

The processor 1001 may be, for example, an MPU, a CPU, or a graphics processing unit (GPU). The processor 1001 may include a plurality of processors. The memory 1002 is, for example, a combination of a volatile memory and a nonvolatile memory. The functions of each device are implemented by the processor 1001 reading a program stored in the memory 1002 and executing the program while sending and receiving necessary information via the interface 1003.

The program includes a group of instructions (or software codes) for causing a computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the embodiment described above, and may be modified as appropriate without departing from the spirit and scope of the disclosure.

What is claimed is:

1. A control system that controls a system including an autonomously movable mobile robot configured to transport a transport object, wherein
    the mobile robot includes at least one light-emitting unit, and
    the control system is configured to change a light emission pattern of the light-emitting unit according to transport object information indicating whether the mobile robot is transporting the transport object, wherein
    the system includes a server that is connectable to the mobile robot via wireless communication, and
    the control system is configured to determine, based on an image of the mobile robot captured by a camera, the transport object information from the light emission pattern shown by the image, at least when the server is unable to communicate with the mobile robot.
2. The control system according to claim 1, wherein when the mobile robot is transporting the transport object, the transport object information includes information indicating the transport object being transported by the mobile robot.
3. The control system according to claim 1, wherein
    the mobile robot is configured to transport the transport object by using a transport box configured to house the transport object, and
    when the mobile robot is transporting the transport object, the transport object information includes information indicating a type of the transport box being transported by the mobile robot.
4. The control system according to claim 1, wherein
    the at least one light-emitting unit includes a plurality of light-emitting units mounted at a plurality of positions away from each other, and
    the control system is configured to change the light emission pattern by changing a position where light is emitted.
5. The control system according to claim 1, wherein
    the at least one light-emitting unit includes a plurality of light-emitting units mounted at a plurality of positions away from each other, and
    the control system is configured to change the light emission pattern by changing positions where light is synchronously emitted.
6. The control system according to claim 5, wherein the control system is configured to cause light to be emitted in a light emission pattern having a mutually complementary relationship at the positions where light is synchronously emitted.
7. The control system according to claim 1, wherein
    the mobile robot includes a contact portion configured to contact the transport object when the transport object is loaded and transported, and
    the at least one light-emitting unit includes a first light-emitting unit mounted around the contact portion.
8. The control system according to claim 1, wherein
    the mobile robot includes an operation interface configured to operate the mobile robot, and
    the at least one light-emitting unit includes a second light-emitting unit mounted on or around the operation interface.
9. The control system according to claim 1, wherein the control system is configured to change the light emission pattern by changing at least one of brightness, hue, saturation, and lightness of light that is emitted from the light-emitting unit.
10. A control method for controlling a system including an autonomously movable mobile robot that is configured to transport a transport object and includes at least one light-emitting unit, and a server that is connectable to the mobile robot via wireless communication, the control method comprising:
    a step of changing a light emission pattern of the light-emitting unit according to transport object information indicating whether the mobile robot is transporting the transport object, and
    a step of determining, based on an image of the mobile robot captured by a camera, the transport object information from the light emission pattern shown by the image, at least when the server is unable to communicate with the mobile robot.
11. The control method according to claim 10, wherein when the mobile robot is transporting the transport object, the transport object information includes information indicating the transport object being transported by the mobile robot.
12. The control method according to claim 10, wherein
    the mobile robot is configured to transport the transport object by using a transport box configured to house the transport object, and
    when the mobile robot is transporting the transport object, the transport object information includes information indicating a type of the transport box being transported by the mobile robot.
13. The control method according to claim 10, wherein
    the at least one light-emitting unit includes a plurality of light-emitting units mounted at a plurality of positions away from each other, and
    the step of changing the light emission pattern includes changing a position where light is emitted.
14. The control method according to claim 10, wherein
    the at least one light-emitting unit includes a plurality of light-emitting units mounted at a plurality of positions away from each other, and
    the step of changing the light emission pattern includes changing positions where light is synchronously emitted.
15. The control method according to claim 14, further comprising causing light to be emitted in a light emission pattern having a mutually complementary relationship at the positions where light is synchronously emitted.
16. The control method according to claim 10, wherein
    the mobile robot includes a contact portion configured to contact the transport object when the transport object is loaded and transported, and
    the at least one light-emitting unit includes a first light-emitting unit mounted around the contact portion.

17. The control method according to claim 10, wherein
the mobile robot includes an operation interface configured to operate the mobile robot, and
the at least one light-emitting unit includes a second light-emitting unit mounted on or around the operation interface.

18. The control method according to claim 10, wherein the step of changing the light emission pattern includes changing at least one of brightness, hue, saturation, and lightness of light that is emitted from the light-emitting unit.

19. A non-transitory storage medium storing instructions that are executable by one or more processors and that cause the one or more processors to perform a process for controlling a system including an autonomously movable mobile robot configured to transport a transport object, and a server that is connectable to the mobile robot via wireless communication, wherein
the mobile robot includes at least one light-emitting unit,
the process includes changing a light emission pattern of the light-emitting unit according to transport object information indicating whether the mobile robot is transporting the transport object, and
the process includes determining, based on an image of the mobile robot captured by a camera, the transport object information from the light emission pattern shown by the image, at least when the server is unable to communicate with the mobile robot.

* * * * *